(12) United States Patent
Herzog

(10) Patent No.: US 8,660,980 B2
(45) Date of Patent: *Feb. 25, 2014

(54) MONITORING SYSTEM USING KERNEL REGRESSION MODELING WITH PATTERN SEQUENCES

(75) Inventor: James P. Herzog, Downers Grove, IL (US)

(73) Assignee: Smartsignal Corporation, Lisle, IL (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/186,128

(22) Filed: Jul. 19, 2011

(65) Prior Publication Data

US 2013/0024166 A1     Jan. 24, 2013

(51) Int. Cl.
    *G06F 17/00*     (2006.01)
(52) U.S. Cl.
    USPC ............................................. 706/52
(58) Field of Classification Search
    None
    See application file for complete search history.

(56) References Cited

U.S. PATENT DOCUMENTS

| | | | |
|---|---|---|---|
| 3,651,454 A | 3/1972 | Venema et al. |
| 3,851,157 A | 11/1974 | Ellis et al. |
| 3,866,166 A | 2/1975 | Kerscher et al. |
| 3,906,437 A | 9/1975 | Brandwein et al. |
| 3,992,884 A | 11/1976 | Pacault |
| 4,057,847 A | 11/1977 | Lowell et al. |
| 4,067,061 A | 1/1978 | Juhasz |
| 4,071,898 A | 1/1978 | Schorsch et al. |
| 4,080,654 A | 3/1978 | Walley, Jr. |
| 4,212,064 A | 7/1980 | Forsythe et al. |
| 4,267,569 A | 5/1981 | Baumann et al. |
| 4,271,402 A | 6/1981 | Kastura et al. |
| 4,295,128 A | 10/1981 | Hashemian et al. |
| 4,296,409 A | 10/1981 | Whitaker et al. |
| 4,330,838 A | 5/1982 | Yoneda et al. |
| 4,334,136 A | 6/1982 | Mahan et al. |
| 4,398,258 A | 8/1983 | Naitoh et al. |

(Continued)

FOREIGN PATENT DOCUMENTS

| | | |
|---|---|---|
| EP | 0840244 | 5/1998 |
| EP | 2333629 A1 | 6/2011 |

(Continued)

OTHER PUBLICATIONS

PCT Search Report issued in connection with corresponding WO Patent Application No. US2012/044614 dated on Sep. 19, 2012.

(Continued)

*Primary Examiner* — Jeffrey A Gaffin
*Assistant Examiner* — Dave Misir
(74) *Attorney, Agent, or Firm* — Global Patent Operation; Mark A. Conklin

(57) ABSTRACT

A monitoring system for determining the condition of an object includes an empirical model with reference data that indicates the normal operational state of the object, and input pattern arrays. Each input pattern array has a plurality of time-ordered input vectors, while each input vector has input values representing a plurality of parameters indicating the current condition of the object. The empirical model generates estimate values based on a calculation that uses an input pattern array and the reference data to determine a similarity measure between the input values and reference data. A differencing module compares the estimates values to the corresponding input values so that resulting values from the comparison can be used to determine the condition of the object.

41 Claims, 7 Drawing Sheets

(56) References Cited

U.S. PATENT DOCUMENTS

| | | | |
|---|---|---|---|
| RE31,582 E | 5/1984 | Hosaka et al. | |
| 4,521,885 A | 6/1985 | Melocik et al. | |
| 4,667,176 A | 5/1987 | Matsuda | |
| 4,677,429 A | 6/1987 | Glotzbach | |
| 4,849,894 A | 7/1989 | Probst | |
| 4,924,418 A | 5/1990 | Bachman et al. | |
| 4,937,763 A | 6/1990 | Mott | |
| 4,965,549 A | 10/1990 | Koike | |
| 4,975,685 A | 12/1990 | Rahhal | |
| 4,978,291 A | 12/1990 | Nakai | |
| 4,990,885 A | 2/1991 | Irick et al. | |
| 5,003,478 A | 3/1991 | Kobayashi et al. | |
| 5,003,479 A | 3/1991 | Kobayashi et al. | |
| 5,009,833 A | 4/1991 | Takeuchi et al. | |
| 5,010,487 A | 4/1991 | Stonehocker | |
| 5,012,414 A | 4/1991 | Ishii et al. | |
| 5,012,421 A | 4/1991 | Ishii | |
| 5,034,889 A | 7/1991 | Abe | |
| 5,038,545 A | 8/1991 | Hiendl | |
| 5,056,023 A | 10/1991 | Abe | |
| 5,063,513 A | 11/1991 | Shank et al. | |
| 5,067,099 A | 11/1991 | McCown et al. | |
| 5,072,391 A | 12/1991 | Abe | |
| 5,091,856 A | 2/1992 | Hasegawa et al. | |
| 5,164,895 A | 11/1992 | Lunz et al. | |
| 5,173,856 A | 12/1992 | Purnell et al. | |
| 5,187,735 A | 2/1993 | Garcia et al. | |
| 5,214,582 A | 5/1993 | Gray | |
| 5,222,065 A | 6/1993 | Krogmann | |
| 5,239,462 A | 8/1993 | Jones et al. | |
| 5,255,208 A | 10/1993 | Thakore et al. | |
| 5,262,941 A | 11/1993 | Saladin et al. | |
| 5,291,420 A | 3/1994 | Matsumoto et al. | |
| 5,309,139 A | 5/1994 | Austin | |
| 5,361,336 A | 11/1994 | Atchison | |
| 5,387,783 A | 2/1995 | Mihm et al. | |
| 5,390,776 A | 2/1995 | Thompson | |
| 5,402,521 A | 3/1995 | Niida et al. | |
| 5,442,553 A | 8/1995 | Parrillo | |
| 5,450,321 A | 9/1995 | Crane | |
| 5,450,537 A | 9/1995 | Hirai et al. | |
| 5,455,777 A | 10/1995 | Fujiyama et al. | |
| 5,459,675 A | 10/1995 | Gross et al. | |
| 5,479,574 A | 12/1995 | Glier et al. | |
| 5,481,674 A | 1/1996 | Mahavadi | |
| 5,502,543 A | 3/1996 | Aboujaoude | |
| 5,544,320 A | 8/1996 | Konrad | |
| 5,548,528 A | 8/1996 | Keeler et al. | |
| 5,596,507 A | 1/1997 | Jones et al. | |
| 5,611,052 A | 3/1997 | Dykstra et al. | |
| 5,629,872 A | 5/1997 | Gross et al. | |
| 5,629,879 A | 5/1997 | Lelle | |
| 5,663,894 A | 9/1997 | Seth et al. | |
| 5,671,635 A | 9/1997 | Nadeau et al. | |
| 5,680,541 A | 10/1997 | Kurosu et al. | |
| 5,689,416 A | 11/1997 | Shimizu et al. | |
| 5,696,907 A | 12/1997 | Tom | |
| 5,699,403 A | 12/1997 | Ronnen | |
| 5,704,029 A | 12/1997 | Wright, Jr. | |
| 5,708,780 A | 1/1998 | Levergood et al. | |
| 5,714,683 A | 2/1998 | Maloney | |
| 5,727,163 A | 3/1998 | Bozos | |
| 5,737,228 A | 4/1998 | Ishizuka et al. | |
| 5,745,654 A | 4/1998 | Titan | |
| 5,748,469 A | 5/1998 | Pyotsia | |
| 5,753,805 A | 5/1998 | Maloney | |
| 5,761,090 A | 6/1998 | Gross et al. | |
| 5,761,640 A | 6/1998 | Kalyanswamy et al. | |
| 5,764,509 A | 6/1998 | Gross et al. | |
| 5,774,379 A | 6/1998 | Gross et al. | |
| 5,774,882 A | 6/1998 | Keen et al. | |
| 5,774,883 A | 6/1998 | Andersen et al. | |
| 5,784,285 A | 7/1998 | Tamaki et al. | |
| 5,790,977 A | 8/1998 | Ezekiel | |
| 5,791,147 A | 8/1998 | Earley et al. | |
| 5,797,133 A | 8/1998 | Jones et al. | |
| 5,805,442 A | 9/1998 | Crater et al. | |
| 5,819,029 A | 10/1998 | Edwards et al. | |
| 5,819,236 A | 10/1998 | Josephson | |
| 5,819,291 A | 10/1998 | Haimowitz et al. | |
| 5,822,212 A | 10/1998 | Tanaka et al. | |
| 5,832,465 A | 11/1998 | Tom | |
| 5,845,627 A | 12/1998 | Olin et al. | |
| 5,848,396 A | 12/1998 | Gerace | |
| 5,867,118 A | 2/1999 | McCoy et al. | |
| 5,870,721 A | 2/1999 | Norris | |
| 5,878,403 A | 3/1999 | DeFrancesco et al. | |
| 5,886,913 A | 3/1999 | Marguinaud et al. | |
| 5,905,989 A | 5/1999 | Biggs | |
| 5,911,135 A | 6/1999 | Atkins | |
| 5,930,776 A | 7/1999 | Dykstra et al. | |
| 5,930,779 A | 7/1999 | Knoblock et al. | |
| 5,940,811 A | 8/1999 | Norris | |
| 5,940,812 A | 8/1999 | Tengel et al. | |
| 5,950,179 A | 9/1999 | Buchanan et al. | |
| 5,956,664 A | 9/1999 | Bryan | |
| 5,960,411 A | 9/1999 | Hartman et al. | |
| 5,961,560 A | 10/1999 | Kemner | |
| 5,963,884 A | 10/1999 | Billington et al. | |
| 5,966,699 A | 10/1999 | Zandi | |
| 5,970,430 A | 10/1999 | Burns et al. | |
| 5,970,478 A | 10/1999 | Walker et al. | |
| 5,987,399 A | 11/1999 | Wegerich et al. | |
| 5,987,434 A | 11/1999 | Libman | |
| 5,995,911 A | 11/1999 | Hart | |
| 5,995,947 A | 11/1999 | Fraser et al. | |
| 6,000,832 A | 12/1999 | Franklin et al. | |
| 6,002,839 A | 12/1999 | Keeler et al. | |
| 6,009,381 A | 12/1999 | Ono | |
| 6,013,108 A | 1/2000 | Karolys et al. | |
| 6,014,645 A | 1/2000 | Cunningham | |
| 6,026,348 A | 2/2000 | Hala | |
| 6,029,149 A | 2/2000 | Dykstra et al. | |
| 6,029,890 A | 2/2000 | Austin | |
| 6,049,827 A | 4/2000 | Sugauchi et al. | |
| 6,076,048 A | 6/2000 | Gunther et al. | |
| 6,088,686 A | 7/2000 | Walker et al. | |
| 6,105,007 A | 8/2000 | Norris | |
| 6,107,919 A | 8/2000 | Wilks et al. | |
| 6,112,190 A | 8/2000 | Fletcher et al. | |
| 6,119,111 A | 9/2000 | Gross et al. | |
| 6,131,076 A | 10/2000 | Stephan et al. | |
| 6,181,975 B1 | 1/2001 | Gross et al. | |
| 6,202,038 B1 | 3/2001 | Wegerich et al. | |
| 6,240,372 B1 | 5/2001 | Gross et al. | |
| 6,245,517 B1 | 6/2001 | Chen et al. | |
| 6,246,972 B1 | 6/2001 | Klimasauskas | |
| 6,289,330 B1 | 9/2001 | Jannarone | |
| 6,327,574 B1 | 12/2001 | Kramer et al. | |
| 6,331,964 B1 | 12/2001 | Barone | |
| 6,356,857 B1 | 3/2002 | Qin et al. | |
| 6,418,431 B1 | 7/2002 | Mahajan et al. | |
| 6,553,334 B2 | 4/2003 | Gross et al. | |
| 6,553,336 B1 | 4/2003 | Johnson et al. | |
| 6,556,939 B1 | 4/2003 | Wegerich | |
| 6,567,795 B2 | 5/2003 | Alouani et al. | |
| 6,571,186 B1 | 5/2003 | Ward | |
| 6,591,166 B1 | 7/2003 | Millett et al. | |
| 6,591,296 B1 | 7/2003 | Ghanime | |
| 6,609,036 B1 | 8/2003 | Bickford | |
| 6,609,212 B1 | 8/2003 | Smith | |
| 6,678,639 B2 | 1/2004 | Little et al. | |
| 6,775,641 B2 | 8/2004 | Wegerich et al. | |
| 6,804,628 B2 | 10/2004 | Gross et al. | |
| 6,859,739 B2 | 2/2005 | Wegerich et al. | |
| 6,876,943 B2 | 4/2005 | Wegerich | |
| 6,892,163 B1 | 5/2005 | Herzog et al. | |
| 6,898,469 B2 | 5/2005 | Bickford | |
| 6,917,839 B2 | 7/2005 | Bickford | |
| 6,952,662 B2 * | 10/2005 | Wegerich et al. | 703/2 |
| 6,957,172 B2 | 10/2005 | Wegerich | |
| 6,975,962 B2 | 12/2005 | Wegerich et al. | |
| 6,999,899 B2 | 2/2006 | Gross et al. | |
| 7,016,816 B2 | 3/2006 | Mott | |

(56) References Cited

U.S. PATENT DOCUMENTS

| | | | |
|---|---|---|---|
| 7,085,675 B2 | 8/2006 | Wegerich | |
| 7,233,886 B2* | 6/2007 | Wegerich et al. | 703/2 |
| 7,308,385 B2* | 12/2007 | Wegerich et al. | 702/183 |
| 7,373,283 B2* | 5/2008 | Herzog et al. | 703/2 |
| 7,386,426 B1 | 6/2008 | Black et al. | |
| 7,403,869 B2 | 7/2008 | Wegerich et al. | |
| 7,539,597 B2* | 5/2009 | Wegerich et al. | 702/185 |
| 7,621,141 B2 | 11/2009 | McCormick et al. | |
| 7,630,820 B2* | 12/2009 | Sims et al. | 701/100 |
| 7,640,145 B2 | 12/2009 | Wegerich et al. | |
| 7,739,096 B2 | 6/2010 | Wegerich et al. | |
| 7,797,259 B2 | 9/2010 | Jian et al. | |
| 7,844,558 B2* | 11/2010 | Yuan et al. | 706/45 |
| 7,941,701 B2 | 5/2011 | Wegerich et al. | |
| 2002/0065698 A1 | 5/2002 | Schick | |
| 2002/0128731 A1* | 9/2002 | Wegerich et al. | 700/31 |
| 2002/0152056 A1* | 10/2002 | Herzog et al. | 703/2 |
| 2002/0183971 A1* | 12/2002 | Wegerich et al. | 702/185 |
| 2003/0028269 A1 | 2/2003 | Spriggs | |
| 2003/0040878 A1 | 2/2003 | Rasmussen | |
| 2003/0055607 A1* | 3/2003 | Wegerich et al. | 702/188 |
| 2003/0055666 A1 | 3/2003 | Roddy | |
| 2003/0060808 A1 | 3/2003 | Wilk | |
| 2003/0093521 A1 | 5/2003 | Schlonski | |
| 2003/0109951 A1 | 6/2003 | Hsiung | |
| 2003/0125248 A1 | 7/2003 | Hair | |
| 2003/0126258 A1 | 7/2003 | Conkright | |
| 2004/0019406 A1 | 1/2004 | Wang | |
| 2004/0088093 A1 | 5/2004 | Yao | |
| 2004/0243636 A1 | 12/2004 | Hasiewicz et al. | |
| 2004/0260515 A1* | 12/2004 | Wegerich et al. | 702/182 |
| 2005/0021187 A1 | 1/2005 | Wang | |
| 2005/0021212 A1 | 1/2005 | Gayme | |
| 2005/0027400 A1 | 2/2005 | Wang | |
| 2005/0096757 A1 | 5/2005 | Frerichs | |
| 2005/0210337 A1 | 9/2005 | Chester | |
| 2005/0261837 A1* | 11/2005 | Wegerich et al. | 702/19 |
| 2006/0036403 A1* | 2/2006 | Wegerich et al. | 702/183 |
| 2007/0010720 A1* | 1/2007 | Mott | 600/300 |
| 2008/0071501 A1* | 3/2008 | Herzog | 702/185 |
| 2008/0183425 A1 | 7/2008 | Hines | |
| 2009/0043405 A1 | 2/2009 | Chester | |
| 2009/0043467 A1 | 2/2009 | Filev | |
| 2011/0172504 A1* | 7/2011 | Wegerich | 600/301 |

FOREIGN PATENT DOCUMENTS

| | | |
|---|---|---|
| JP | 06274784 | 9/1944 |
| JP | 61160111 | 7/1986 |
| JP | 02004300 | 9/1990 |
| JP | 05126980 | 5/1993 |
| JP | 06278179 | 10/1994 |
| JP | 08220279 | 8/1996 |
| JP | 09166483 | 6/1997 |
| JP | 11311591 | 9/1999 |
| JP | 06161982 | 6/2006 |
| WO | 9016048 | 12/1990 |
| WO | WO9504878 | 2/1995 |
| WO | WO9722073 | 6/1997 |
| WO | WO0067412 | 11/2000 |
| WO | 01/67623 A2 | 9/2001 |
| WO | WO0167262 | 9/2001 |
| WO | WO0235299 | 5/2002 |
| WO | WO02057856 | 7/2002 |
| WO | WO02086726 | 10/2002 |
| WO | WO2005038545 | 4/2005 |

OTHER PUBLICATIONS

Black et al—Online Implementation of Instrument Surveillance and Calibration Verification Using Autoassociative Neural Networks, published in the proceedings of Maintenance and Reliability Conference (MARCON 97), May 20-22, 1997.

Black et al—System Modeling and Instrument Calibration Verification with a Nonlinear State Estimation Tenique, Maintenance and Reliability Conference Proceedings, May 12-14, 1998, pp. 58.01-58.15, vol. 2 of 2, MARCON 98, Knoxville, Tennessee.

Griebenow et al—"Applied Pattern Recognition for Plant Monitoring and Data Validation." Presented at the Fifth International Joint ISA POWID/EPRI Controls and Instrumentation Conference, La Jolla, California, Jun. 19-21, 1995. (11 pp.).

Hansen et al—"Similarity Based Regression: Applied Advanced Pattern Recognition for Power Plant Analysis," presented at the 1994 EPRI Heat Rate Improvement Conference (9pp.).

Harris et al—"Empirical Models for Intelligent Data Validation", Instrumentation, Controls, and Automation in the Power Industry; Proceedings of the . . . Power Instrumentation Symposium, Jun. 1992 vol. 35 (pp. 311-326).

Herzog et al—"Dynamics Sensor Validation for Reusable Launch Vehicle Propulsion", presented at the 34th AIAA/ASME/SAE/ASEE Joint Propulsion Conference & Exhibit, Cleveland, Ohio, Jul. 13-15, 1998, AIAA-98-3604 (12 pp.).

Herzog et al—"MSET Modeling of Crystal River-3 Venturi Flow Meters", 6th International Conference on Nuclear Engineering, ICONE-6169, May 10-14, 1998, Copyright. 1998 ASME (12 pp).

Hines et al—"An Autoassociative Empirical Modeling Toolbox for On-Line Monitoring," 18th International Congress and Exhibition on Condition Monitoring and Diagnostic Engineering Management, Aug. 2005, 9 pages, Cranfield, Bedfordshire, United Kingdom.

Hines et al—"Plant Wide Sensor Calibration Monitoring", Proceedings of the 1996 IEEE International Symposium on Intelligent Control, Sep. 1996, pp. 378-383.

Hines et al - "Technical Review of On-Line Monitoring Techniques for Performance Assessment," publication prepared for the Division of Engineering Technology, Office of the Nuclear Regulatory Commission, Jan. 2006, pp. 1-127, Washington D.C.

Lehoczky—"Real-time queueing network Theory"; Real-Time Systems Symposium, 1997. Proceedings., The 18th IEEE, Dec. 2-5, 1997 pp. 58-67 [retrieved from IEEE database on May 5, 2009].

Mott et al—"A Universal, Fault-Tolerant, Non-Linear Analytic Network for Modeling and Fault Detection," Proceedings of the 8th Power Plant dynamics, Control & Testing Symposium, Knoxville, Tennessee, May 27-29, 1992 (14pp.).

Nieman et al—Early Detection of Signal or Process Variation in the Co-Generation Plant at US Steel, Gary Works, pp. 8, 2004.

Tatiraju et al—Multi-Rate Nonlinear State and Parameter Estimation in a Bioreactor, 11pgs, 1998.

Wegerich et al—Nonparametric Modeling of Vibration Signal Features for Equipment Health Monitoring—2003 IEEE Aerospace Conference. Mar. 2003, vol. 7, pp. 3113-3121.

Search Report and Written opinion from corresponding International Application No. PCT/US2012/044622, dated Nov. 12, 2012.

"ACM Workshop User's Guide"—Performance Consulting Services, Version 2001, Incorporated, Copyright 1994-2001.

Agogino et al—"Intelligent Sensor Validation for On-Line Process Monitoring Diagnosis and Control"; Final Report 1993-94.

Caldwell et al—"Remote Instrument Diagnosis on the Internet," IEEE Intelligent Systems, vol. 13, No. 3, pp. 70-76, May-Jun. 1998. (Bibliographic citation and Abstract, pp. 9-10 of DIALOG(R) File 2:INSPEC report).

Chapelle et al—"Support Vector Machines for Histogram-Based Image Classification", Sep. 1999, IEEE Transactions on Neural Networks, vol. 10, No. 5, pp. 1055-1064.

Feridun—"Diagnosis of Connectivity Problems in the Internet," Integrated Network Management, II. Proceedings of the IFIP TC6/WG6 Second International Symposium, pp. 691-701, 1991. (bibliographic citation and Abstract, pp. 12-13 Dialog File 2:INSPEC report).

Flori—ModelWareTM Product Review reprinted from Computerized Investing, Sep./Oct. 1992, vol. XI, No. 5, copyright by The American Association of Individual Investors (pp. 8-10).

Freund et al—Statistical Methods, 1993, Academic Press, pp. 8-15 and 574-575.

Furuya et al—"WWW-Browser-Based Monitoring System for Industrial Plants," Conference of the IEEE Industiral Electronics Society, Part vol. 3, pp. 1146-41, 1999. (Bibliographic citation and Abstract. 2-3 of Dialog File 2:INSPEC report).

(56) References Cited

OTHER PUBLICATIONS

Gross et al—"Model-Based Nuclear Power Plant Monitoring and Fault Detection: Theoretical Foundations", presented at the International Conference on Intelligent System Application to Power Systems (ISAP '97), Jul. 6-10, 1997, Seoul, South Korea (pp. 60-65).
Hussain et al—"Discretization: An Enabling Technique", Jun. 1999, The National University of Singapore, pp. 1-27.
Julier et al—A New Extension of the Kalman Filter to Nonlinear Systems, In: Proc. AeroSense: The 11th International Symposium on Aerospace/Defence Sensing, Simulation and Controls (1997).
Kosiur—Understanding Electronic Commerce, 1997, Microsoft Press, a Division of Microsoft Corporation.
Long et al—"Sensor Fusion and Failure Detection Using Virtual Sensors"; Proceedings of the 1999 American Control Conference; vol. 4; Jun. 1999; pp. 2417-2421.
Maloney et at—Pneumatic and Thermal State Estimators for Production Engine Control and Diagnostics by SAE Technical Paper Series 980517, International Congress and Exposition, Feb. 23-26, 1998, Copyright 1998 Society of Automotive Engineers, Inc. (ISSN 0148-7191).
Miron et al—"Fault-Tolerance Improvement for a MSET Model of the Crystal River-3 Feedwater Flow System", 1998 IEEE Nuclear Science Symposium, Nov. 1998, pp. 993-994.
Orsagh et al—"An Internet-based Machinery Health Monitoring System," MFPT Committee Meeting, Virginia Beach, VA, May 2000.
O'Sullivan—"Application of a New Technique for Modeling System Behavior", presented at the ISA Symposium, Edmonton, Alberta, May 1, 1991, COPYRGT. Copyright 1991 Instrument Society of America (21 pp.).
Rajan et al—"Machine Learning Algorithm for Fault Diagnosis in Analog Circuits", p. 1874-1879, Jan. 1998.
Robertson et al—"Development and statistical interpretation of tools for nonlinear estimation," Auburn University, 1996, 116 pages; AAT 9700752.
Rubinstein—"Simulation and the Monte Carlo Method", 1981, John Wiley & Sons.
Shankar—"On-Line Monitoring of Instrument Channel Performance," EPRI Technical Report (TR) 104965-R1, Sep. 2000, pp. 1-370, Palo Alto, California.
Singer et al—"A Fault-Tolerant Sensory Diagnostic System for Intelligent Vehicle Application" by, presented at the IEEE International Symposium on Intelligent Vehicles, Detroit, MI, Sep. 25-26, 1995 (7pp.).
SmartSignal web page downloaded from http://web.archive.org/web/19990209022642/http://www.smartsignal.com on May 5, 2010.
SmartSignal, trademark with text Feb. 1999. p. 1-16.
Smith—Using Data Mining for Plant Maintenance. Plant Engineering. Dec. 2002, vol. 56, No. 12, pp. 26-30.
Sowizral—"Virtual Sensors"; Proceedings SPIE International Society for Optical Engineering; vol. 2409; Feb. 7-9, 1995; pp. 246-254.
Spatial Tech 2004 "For the First Time, Oil and Gas Lease Site Operators Will be Notified of Equipment Problems Before Costly Shutdowns" Dec. 2000. p. 1-3.
Spoelder—"Virtual Instrumentation and Virtual Environments" IEEE Instrumentation and Measurement Magazine; vol. 2, Issue 3; Sep. 1999; pp. 14-19.
Tarassenko et al—Novelty Detection in Jet Engines. IEE Colloquium on Condition Monitoring: Machinery, External Structures and Health. Apr. 1999, pp. 4/1-4/5.
Tarsala—"H-P Computers Will Fix Themselves," CBS MarketWatch.com, Jan. 18, 2000, two pages from the Internet discussing Hewlett-Packard's plan for remote Internet access to diagnose and fix problems.
Tatiraju et al—Multi-Rate Nonlinear State Estimation and Parameter Estimation in a Bioreactor, Biotechnology and Bioengineering, vol. 63, No. 1, Apr. 5, 1999.
Teranet IA Incorporated, "ModelWare.TM. User's Manual", Copyright 1992.
Tucker—"Modelware a New Approach to Prediction" Vendor's Forum, Jan./Feb. 1993 (pp. 14-15, 30).
Various—"IEEE Instrumentation and Measurement Technology Conference Sensing, Processing, Networking"; Instrumentation and Measurement Technology Conference; vol. 2; May 19-21, 1997.
Wilks et al—Monitoring your Equipment, pp. 14, 2004.
Wong et al—"Pattern recognition from neural network with functional dependency preprocessing", 1997, Proceedings of IEEE Speech and Technologies for Computing and Telecommunications.

\* cited by examiner

MONITORING SYSTEM USING KERNEL REGRESSION MODELING WITH PATTERN SEQUENCES

BACKGROUND OF THE INVENTION

1. Field of the Invention

The subject matter disclosed herein relates generally to the field of kernel regression modeling used for predictive condition monitoring and prognostics of an object such as machine, system, or process, and more particularly to the use of multivariate models for analysis of measurements of parameters to provide an assessment of the object being monitored.

2. Brief Description of the Related Art

Kernel regression is a form of modeling used to determine a non-linear function or relationship between values in a dataset and is used to monitor machines or systems to determine the condition of the machine or system. One known form of kernel regression modeling is similarity-based modeling (SBM) disclosed by U.S. Pat. Nos. 5,764,509 and 6,181,975. For SBM, multiple sensor signals measure physically correlated parameters of a machine, system, or other object being monitored to provide sensor data. The parameter data may include the actual or current values from the signals or other calculated data whether or not based on the sensor signals. The parameter data is then processed by an empirical model to provide estimates of those values. The estimates are then compared to the actual or current values to determine if a fault exists in the system being monitored.

More specifically, the model generates the estimates using a reference library of selected historic patterns of sensor values representative of known operational states. These patterns are also referred to as vectors, snapshots, or observations, and include values from multiple sensors or other input data that indicate the condition of the machine being monitored at an instant in time. In the case of the reference vectors from the reference library, the vectors usually indicate normal operation of the machine being monitored. The model compares the vector from the current time to a number of selected learned vectors from known states of the reference library to estimate the current state of the system. Generally speaking, the current vector is compared to a matrix made of selected vectors from the reference library to form a weight vector. In a further step, the weight vector is multiplied by the matrix to calculate a vector of estimate values. The estimate vector is then compared to the current vector. If the estimate and actual values in the vectors are not sufficiently similar, this may indicate a fault exists in the object being monitored.

However, this kernel regression technique does not explicitly use the time domain information in the sensor signals, and instead treat the data in distinct and disconnected time-contemporaneous patterns when calculating the estimates. For instance, since each current vector is compared to the reference library vectors individually, it makes no difference what order the current vectors are compared to the vectors of the reference library—each current vector will receive its own corresponding estimate vector.

Some known models do capture time domain information within a kernel regression modeling construct. For example, complex signal decomposition techniques convert time varying signals into frequency components as disclosed by U.S. Pat. Nos. 6,957,172 and 7,409,320, or spectral features as disclosed by U.S. Pat. No. 7,085,675. These components or features are provided as individual inputs to the empirical modeling engine so that the single complex signal is represented by a pattern or vector of frequency values that occur at the same time. The empirical modeling engine compares the extracted component inputs (current or actual vector) against expected values to derive more information about the actual signal or about the state of the system generating the time varying signals. These methods are designed to work with a single periodic signal such as an acoustic or vibration signal. But even with the system for complex signals, the time domain information is not important when calculating the estimates for the current vector since each current vector is compared to a matrix of vectors with reference or expected vectors regardless of the time period that the input vectors represent.

BRIEF DESCRIPTION OF THE INVENTION

In one aspect, a method for monitoring the condition of an object includes obtaining reference data that indicates the normal operational state of the object, and obtaining input pattern arrays. Each input pattern array has a plurality of time-ordered input vectors, while each input vector has input values representing a plurality of parameters indicating the current condition of the object. Then, at least one processor generates estimate values based on a calculation that uses an input pattern array and the reference data to determine a similarity measure between the input values and reference data. The estimate values are compared to the corresponding input values so that resulting values from the comparison can be used to determine the condition of the object.

In another aspect, a method for monitoring the condition of an object includes obtaining reference data that indicates the normal operational state of the object and in the form of a plurality of learned sequential pattern matrices. In this case, each learned sequential pattern matrix has a plurality of reference vectors, while each reference vector has reference values representing a plurality of parameters. The method also includes obtaining input data representing a plurality of parameters indicating the current condition of the object, and then using at least one processor to generate estimate values based on a calculation that uses the input data and the learned sequential pattern matrices to determine a similarity measure between the input data and reference values in the plurality of reference matrices. After that, the estimate values are compared to the corresponding input values so that resulting values from the comparison can be used to determine the condition of the object.

In yet another aspect, a method for monitoring the condition of an object includes obtaining reference data that indicates the normal operational state of the object, and obtaining input data representing a plurality of parameters indicating the current condition of the object. The method then includes generating, by at least one processor, estimate values based on a calculation that uses both the input data and the reference data to determine similarity measures between the input data and the reference data. The estimate values are generated in the form of an estimate matrix having a plurality of time-ordered estimate vectors, where each estimate vector has estimate values representing multiple parameters. The method then includes comparing at least one estimate vector for each time period represented by the estimate matrices to the input data so that the resulting values from the comparison can be used to determine the condition of the object.

In another form, a monitoring system for determining the condition of an object has an empirical model with reference data that indicates the normal operational state of the object, and input pattern arrays where each input pattern array has a plurality of time-ordered input vectors. Each input vector has input values that represent a plurality of parameters indicating the current condition of the object. The empirical model is configured to generate estimate values based on a calculation that uses an input pattern array and the reference data to determine a similarity measure between the input values and the reference data. A differencing module then compares the estimate values to the corresponding input values so that resulting values from the comparison can be used to determine the condition of the object.

In a further form, a monitoring system for determining the condition of an object has an empirical model operated by at least one processor. The model comprises reference data that indicates the normal operational state of the object and in the form of a plurality of learned sequential pattern matrices. Each learned sequential pattern matrix has a plurality of reference vectors, while each reference vector has reference values representing a plurality of parameters. The model also has input data representing a plurality of parameters that indicate the current condition of the object. The empirical model is configured to generate estimate values based on a calculation that uses the input data and the learned sequential pattern matrices to determine a similarity measure between the input data and reference values in the plurality of reference matrices. The system also has a differencing module comparing the estimate values to the corresponding input values so that resulting values from the comparison can be used to determine the condition of the object.

In yet a further form, a monitoring system for determining the condition of an object has an empirical model with reference data that indicates the normal operational state of the object. The model also has input data representing a plurality of parameters that indicate the current condition of the object. Otherwise, the empirical model is configured to generate estimate values based on a calculation that uses both the input data and the reference data to determine similarity measures between the input data and the reference data. The estimate values are generated in the form of an estimate matrix having a plurality of time-ordered estimate vectors. Each estimate vector has estimate values representing multiple parameters. The system also has a differencing module comparing at least one estimate vector for each time period represented by the estimate matrices to the input data so that the resulting values from the comparison can be used to determine the condition of the object.

DETAILED DESCRIPTION OF THE INVENTION

It has been determined that the accuracy of the estimates in a kernel regression model, and specifically a similarity based model, can be substantially improved by incorporating time domain information into the model. Thus, one technical effect of the present monitoring system and method is to generate estimate data by capturing time domain information from the large numbers of periodic and non-periodic sensor signals that monitor industrial processes, systems, machines, or other objects. The technical effect of the present system also is to operate an empirical model that extends the fundamental non-linear mathematics at the core of kernel regression modeling from a vector-to-vector operation to a matrix-to-matrix (or array-to-array) operation as explained in detail below. Another alternative technical effect of the monitoring system and method is to generate virtual or inferred estimate values for future time points to determine a future condition of the object being monitored whether the reference data used to generate the estimates is data representing normal operation of the object being monitored or failure mode data to better match data from the object that indicates a fault.

Figure 1:
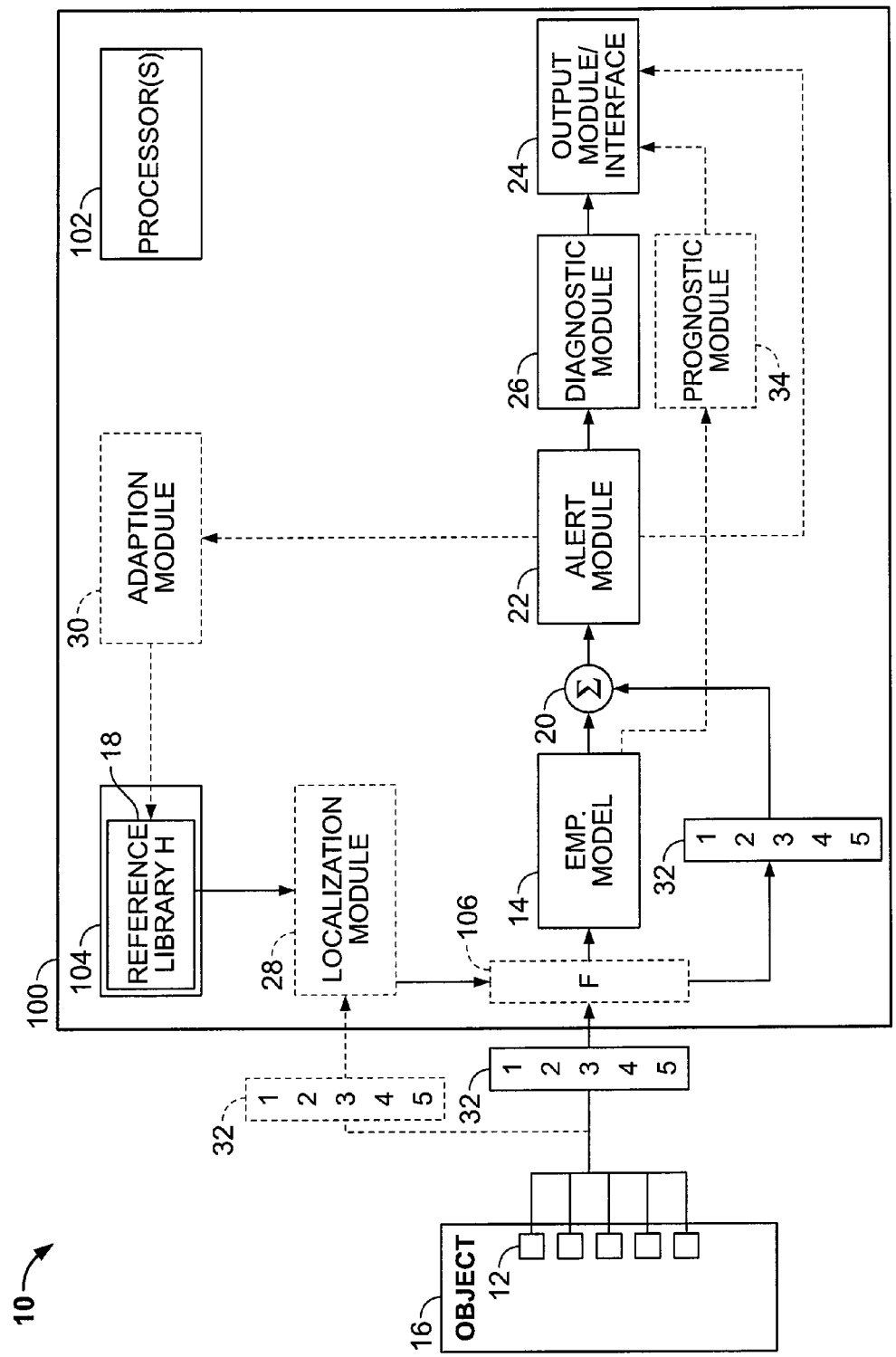
FIG. 1 shows a block diagram of an example arrangement of a monitoring system.

Referring to FIG. 1, a monitoring system 10 incorporating time domain information can be embodied in a computer program in the form of one or more modules and executed on one or more computers 100 and by one or more processors 102. The computer 100 may have one or more memory storage devices 104, whether internal or external, to hold sensor data and/or the computer programs whether permanently or temporarily. In one form, a standalone computer runs a program dedicated to receiving sensor data from sensors on an instrumented machine, process or other object including a living being, measuring parameters (temperature, pressure, and so forth). The object being monitored, while not particularly limited, may be one or more machines in an industrial plant, one or more vehicles, or particular machines on the vehicles such as jet engines to name a few examples. The sensor data may be transmitted through wires or wirelessly over a computer network or the internet, for example, to the computer or database performing the data collection. One computer with one or more processors may perform all of the monitoring tasks for all of the modules, or each task or module may have its own computer or processor performing the module. Thus, it will be understood that processing may take place at a single location or the processing may take place at many different locations all connected by a wired or wireless network.

Figure 2:
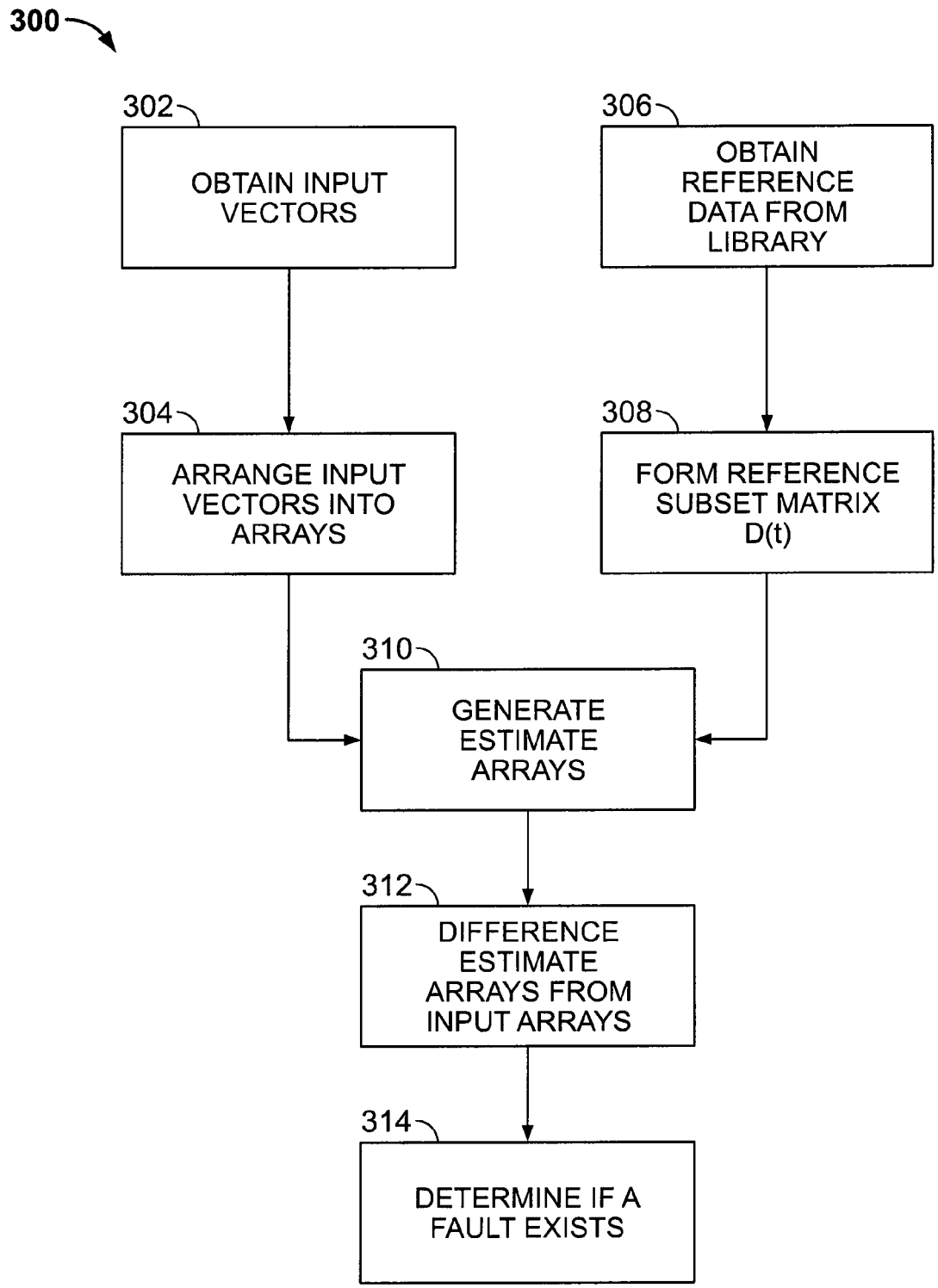
FIG. 2 is flow chart showing the basic process for the monitoring system.

Referring to FIG. 2, in the process (300) performed by the monitoring system 10, the system receives data or signals from sensors 12 on an object 16 being monitored as described above. This data is arranged into input vectors 32 for use by the model 14. Herein, the terms input, actual, and current are used interchangeably, and the terms vector, snapshot, and observation are used interchangeably. The input vector (or actual snapshot for example) represents the operational state of the machine being monitored at a single moment in time.

Additionally, or alternatively, the input vector 32 may include calculated data that may or may not have been calculated based on the sensor data (or raw data). This may include, for example, an average pressure or a drop in pressure. The input vector 32 may also have values representing other variables not represented by the sensors on the object 16. This may be, for example, the average ambient temperature for the day of the year the sensor data is received, and so forth.

The model 14 obtains (302) the data in the form of the vectors 32 and arranges (304) the input vectors into an input array or matrix. It will be understood, however, that the model 14 itself may form the vectors 32 from the input data, or receive the vectors from a collection or input computer or processor that organizes the data into the vectors and arrays. Thus, the input data may be arranged into vector 32 by computer 100, another computer near location of computer 100, or at another location such as near the object 16.

The model 14 also obtains (306) reference data in the form of reference vectors or matrices from reference library 18 and sometimes referred to as a matrix H. The library 18 may include all of the historical reference vectors in the system. The model 14 then uses the reference data and input arrays to generate estimates (310) in the form of a resulting estimate matrix or array. The estimate matrix is provided to a differencing module 20 that determines (312) the difference (or residual) between the estimate values in the estimate matrix and corresponding input values in the input array. The residuals are then used by an alert or analysis management module (or just alert module) 22 to determine (314) if a fault exists.

As shown in dashed line, the monitoring system 10 also may have a Localization Module 28 that changes which data from the reference library is used to form (308) a subset or matrix D(t) (referred to as a three-dimensional collection of learned sequential pattern matrices below (FIG. 6)) to compare to the vectors in each input array. Otherwise, the matrix D(t) of reference data may remain the same for all of the input matrices as explained in detail below. Also, the monitoring system may have an adaptation module 30 that continuously places the input vectors into the reference library to update the data in the library or when a certain event occurs, such as when the model receives data that indicates a new normal condition of the machine not experienced before, for example. This is also described in detail below.

The alert module 22 may provide alerts as well as the residuals directly to an interface or output module 24 for a user to perform their own diagnostic analysis, or a diagnostic module 26 may be provided to analyze the exact nature of the cause of the fault to report diagnostic conclusions and severity ratings to the user through the output module 24.

The output module 24, which may include mechanisms for displaying these results (for example, computer screens, PDA screens, print outs, or web server), mechanisms for storing the results (for example, a database with query capability, flat file, XML file), and/or mechanisms for communicating the results to a remote location or to other computer programs (for example, software interface, XML datagram, email data packet, asynchronous message, synchronous message, FTP file, service, piped command and the like).

A more detailed explanation of the empirical model 14 requires certain knowledge of kernel regression. In pattern recognition techniques such as kernel regression, a pattern consists of input data (as described above) grouped together as a vector. The data for each vector is collected from a piece of equipment at a common point in time. Here, however, and as explained in greater detail below, the pattern (vector) of contemporaneous sensor values associated with existing kernel regression methods is augmented with temporally-related information such as sequential patterns from successive moments in time or the output from time-dependent functions (for example, filters, time-derivatives and so forth) applied to the patterns from successive moments in time. Therefore, the individual patterns (vectors) processed by traditional kernel regression methods are replaced by temporally-related sequences of patterns that form an array (or simply pattern arrays or pattern matrices).

All kernel-based modeling techniques, including kernel regression, radial basis functions, and similarity-based modeling can be described by the equation:

$$x_{est} = \sum_{i=1}^{L} c_i K(x_{new}, x_i) \qquad (1)$$

where a vector $x_{est}$ of sensor signal or sensor value estimates is generated as a weighted sum of results of a kernel function K, which compares the input vector $x_{new}$ of sensor measurements to L learned patterns of sensor data, $x_i$. $x_i$ is formed of reference or learned data in the form of vectors (also referred to as observations, patterns, snapshots, or exemplars). The kernel function results are combined according to weights $c_i$, which may be in the form of vectors and can be determined in a number of ways. The above form is an "autoassociative" form, in which all estimated output signals are also represented by input signals. In other words, for each input value, an estimate sensor value is calculated. This contrasts with the "inferential" form in which certain estimate output values do not represent an existing input value, but are instead inferred from the inputs:

$$y_{est} = \sum_{i=1}^{L} c_i K(x_{new}, x_i) \qquad (2)$$

where in this case, $y_{est}$ is an inferred sensor estimate obtained from the kernel-based comparison of the input vectors $x_{new}$ of other parameters to the L learned exemplars $x_i$ of those parameters. Each learned exemplar $x_i$ is associated with another exemplar vector $y_i$ of the parameters to be estimated, which are combined in a weighted fashion according to the kernel K and vectors $c_i$ (which are functions at least in part of the $y_i$) to predict output $y_{est}$. In a similar fashion, more than one sensor can be simultaneously inferred.

What is common to the kernel-based estimators is the kernel function, and the generation of a result from a linear combination of exemplars (for example, a matrix of the exemplars or vectors), based on the kernel results and the vectors $c_i$ that embodies the exemplars. Kernel function K is a generalized inner product, but in one form has the further characteristic that its absolute value is maximum when $x_{new}$ and $x_i$ are identical.

According to one embodiment of the invention, a kernel-based estimator that can be used to provide the model is Kernel Regression, exemplified by the Nadaraya-Watson kernel regression form:

$$y_{est} = \frac{\sum_{i=1}^{L} y_i^{out} K(x_{new}, x_i^{in})}{\sum_{i=1}^{L} K(x_{new}, x_i^{in})} \quad \text{(Inferential form)} \qquad (3)$$

-continued $$x_{est} = \frac{\sum_{i=1}^{L} x_i K(x_{new}, x_i)}{\sum_{i=1}^{L} K(x_{new}, x_i)} \quad \text{(Autoassociative form)} \quad (4)$$

In the inferential form, a multivariate estimate of inferred parameters $y_{est}$ is generated from the results of the kernel K operator on the input vector of parameter measurements $x_{new}$ and the L learned exemplars $x_i$, linearly combined according to respective learned vectors $y_i$, which are each associated with each $x_i$, and normalized by the sum of kernel results. The $y_i$ represent the L sets of learned measurements for the parameters in Y, which were associated with (such as, measured contemporaneously with) the learned measurements of parameters in X. By way of example, X may comprise a plurality of pressure readings, while Y may represent a corresponding plurality of temperature readings from a common system. In other words, the pressure readings may be used to calculate weights which are then used in a calculation with $y_i$ (the reference vector with previous values of the missing parameter) to calculate estimated temperature readings or sensor values for $y_{est}$.

In the autoassociative form of the kernel regression, a multivariate estimate of parameters $X_{est}$ is generated by a normalized linear combination of the learned measurements of those parameters $x_i$ (for example, in the form of a matrix D of exemplars described below), multiplied by the kernel operation results for the input vector $x_{new}$ vis-à-vis the learned observations $x_i$.

In kernel regression for the present example, the $c_i$ from equations 1 and 2 above are composed of the learned exemplars normalized by the sum of the kernel comparison values. The estimate vectors, $y_{est}$ or $x_{est}$, comprise a set of estimated parameters that are, according to one example, differenced with actual measured values ($x_{new}$, or $y_{new}$, which is not input to the model in the inferential case) to provide residuals.

In a specific example of Kernel regression, a similarity-based model (SBM) can be used as the model according to the present invention. Whereas the Nadaraya-Watson kernel regression provides estimates that are smoothed estimates given a set of (possibly noisy) learned exemplars, SBM provides interpolated estimates that fit the learned exemplars when they also happen to be the input as well, such as if the input vector is identical to one of the learned exemplars. This can be advantageous in detecting deviations in parameters, since noise in these signals will be overfit to a certain extent (if noise was similarly present on the exemplars from which the model was made), thus removing the noise somewhat from the residuals as compared to the Nadaraya-Watson kernel regression approach. SBM can be understood as a form of kernel-based estimator by rewriting the kernel function K as the operator $\otimes$, and equating the set of learned exemplars $x_i$ as a matrix D with the elements of $x_i$ forming the rows, and the $x_i$ observations forming its columns. Then:

$$K_{i=1}^{L}(x_i, x_{new}) = (D^T \otimes x_{new}) \quad (5)$$

where D has been transposed, which results in a column vector of kernel values, one for each observation $x_i$ in D. Similarly, the comparison of all exemplars with each other can be represented as:

$$K_{i,j=1}^{L}(x_i, x_j) = (D^T \otimes D) \quad (6)$$

Figure 3:
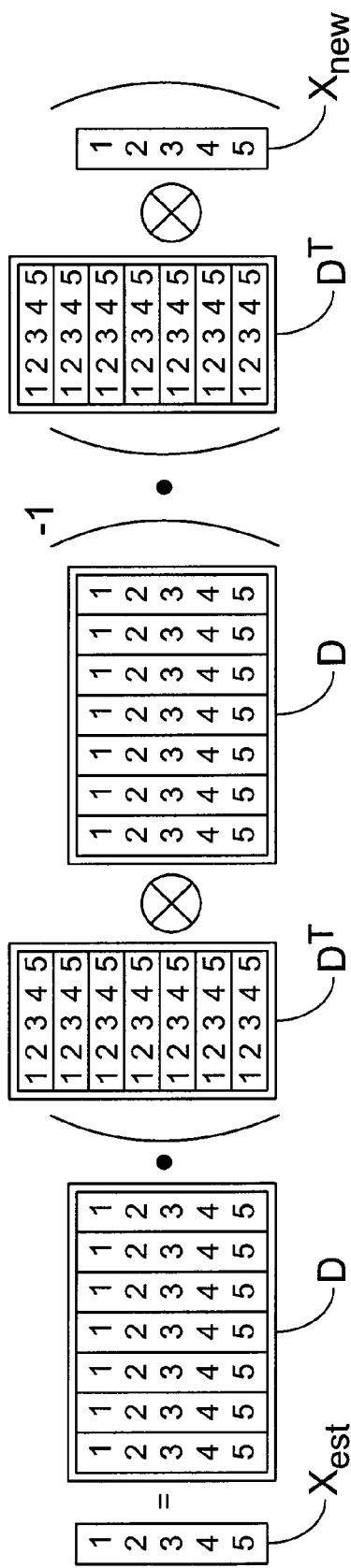
FIG. 3 is a schematic diagram of the autoassociative similarity based modeling equation.

Then, the autoassociative form of SBM generates an estimate vector according to:

$$x_{est} = D \cdot (D^T \otimes D)^{-1} \cdot (D^T \otimes x_{new}) \quad (7)$$

where $x_{est}$ is the estimate vector, $x_{new}$ is the input observation, and D is a learned vector matrix comprising the set (or subset) of the learned exemplary observations of the parameters. The similarity operator or kernel is signified by the symbol, $\otimes$ and has the general property of rendering a similarity score for the comparison of any two vectors from each of the operands. Thus, the first term $(D^T \otimes D)$ would yield a square matrix of values of size equal to the number of observations in D as shown in equation (6) above. The term $(D^T \otimes x_{new})$ would yield a vector of similarity values, one similarity value for each vector in D as shown in equation 5. This similarity operator is discussed in greater detail below. The equation is shown schematically on FIG. 3 and shows how each component of the equation is formed by vectors as represented by the rectangular boxes. In this example, each vector contains sensor values for parameters 1-5 (although this could also include other non-sensor values as described above). It will be understood that the numbers 1-5 indicate which parameter is being represented and not the exact sensor value. Thus, the sensor value itself will be different for the different parts of the equation (for example, the value for parameter 1 may be different in $x_{new}$ versus that in D versus that in $x_{est}$).

It will also be understood that for equation (7), time domain information among a group of input vectors is ignored to generate estimates. In other words, since equation (7) generates an estimate vector by using a single input vector $x_{new}$, the order in which the vectors in a group of input vectors are analyzed to generate estimate vectors is largely unimportant. If a certain order related to time (such as sequential) is needed later in the process to determine if a fault exists or to diagnose the particular type of fault for example, then the vectors can be ordered as desired after generating the estimates.

The estimate can further be improved by making it independent of the origin of the data, according to the following equation, where the estimate is normalized by dividing by the sum of the "weights" created from the similarity operator:

$$x_{est} = \frac{D \cdot (D^T \otimes D)^{-1} \cdot (D^T \otimes x_{new})}{\sum ((D^T \otimes D)^{-1} \cdot (D^T \otimes x_{new}))} \quad (8)$$

Figure 4:
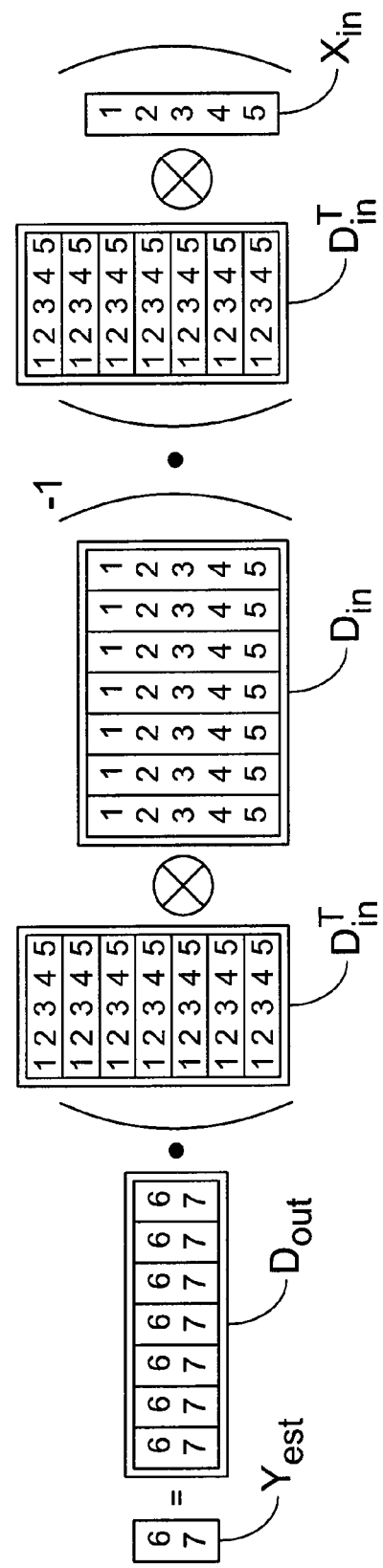
FIG. 4 is a schematic diagram of one form of the inferential similarity based modeling equation.

In the inferential form of similarity-based modeling, the inferred parameters vector $y_{est}$ is estimated from the learned observations and the input according to:

$$y_{est} = D_{out} \cdot (D_{in}^T \otimes D_{in})^{-1} \cdot (D_{in}^T \otimes x_{in}) \quad (9)$$

where $D_{in}$ has the same number of rows as actual sensor values (or parameters) in $x_{in}$, and $D_{out}$ has the same number of rows as the total number of parameters including the inferred parameters or sensors. Equation (9) is shown schematically on FIG. 4 to show the location of the vectors, the input values (1 to 5), and the resulting inferred values (6-7).

In one form, the matrix of learned exemplars $D_a$ can be understood as an aggregate matrix containing both the rows that map to the sensor values in the input vector $x_{in}$ and rows that map to the inferred sensors:

$$D_a = \begin{bmatrix} D_{in} \\ D_{out} \end{bmatrix} \quad (10)$$

Normalizing as before using the sum of the weights:

$$y_{est} = \frac{D_{out} \cdot (D_{in}^T \otimes D_{in})^{-1} \cdot (D_{in}^T \otimes x_{in})}{\sum ((D_{in}^T \otimes D_{in})^{-1} \cdot (D_{in}^T \otimes x_{in}))} \quad (11)$$

It should be noted that by replacing $D_{out}$ with the full matrix of learned exemplars $D_a$, similarity-based modeling can simultaneously calculate estimates for the input sensors (autoassociative form) and the inferred sensors (inferential form):

$$\begin{bmatrix} x_{est} \\ y_{est} \end{bmatrix} = \frac{D_a \cdot (D_{in}^T \otimes D_{in})^{-1} \cdot (D_{in}^T \otimes x_{in})}{\sum ((D_{in}^T \otimes D_{in})^{-1} \cdot (D_{in}^T \otimes x_{in}))} \quad (12)$$

Figure 5:
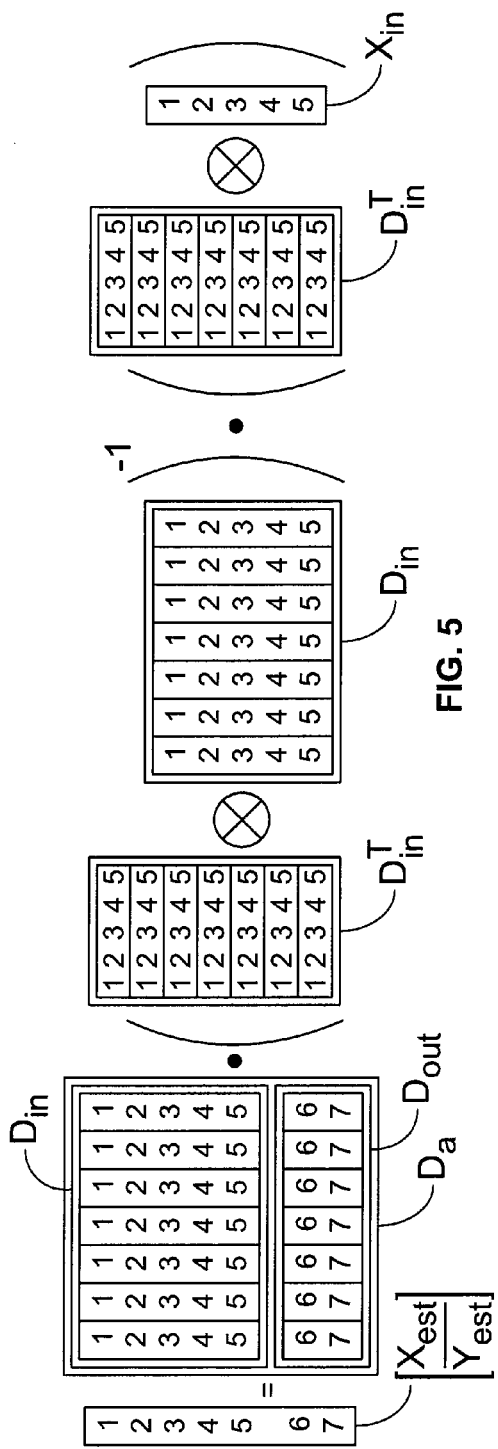
FIG. 5 is a schematic diagram of another form of the inferential similarity based modeling equation.

Referring to FIG. 5, Equation (12) uses the matrix $D_a$ with reference values for both the input and inferred values. This results in an estimate vector with both representative input values and inferred values.

Yet another kernel-based modeling technique similar to the above is the technique of radial basis functions. Based on neurological structures, radial basis functions make use of receptive fields, in a special form of a neural network, where each basis function forms a receptive field in the n-dimensional space of the input vectors, and is represented by a hidden layer node in a neural network. The receptive field has the form of the kernels described above, where the "center" of the receptive field is the exemplar that particular hidden unit represents. There are as many hidden unit receptive fields as there are exemplars. The multivariate input observation enters the input layer, which is fully connected with the hidden layer. Thus, each hidden unit receives the full multivariate input observation, and produces a result that is maximum when the input matches the "center" of the receptive field, and diminishes as they become increasingly different (akin to SBM described above). The output of the hidden layer of receptive field nodes is combined according to weights $c_i$ (as above in equation 1).

As mentioned above, the kernel can be chosen from a variety of possible kernels, and in one form is selected such that it returns a value (or similarity score) for the comparison of two identical vectors that has a maximum absolute value of all values returned by that kernel. While several examples are provided herein, they are not meant to limit the scope of the invention. Following are examples of kernels/similarity operators that may be used according to the invention for the comparison of any two vectors $x_a$ and $x_b$.

$$K_h(x_a, x_b) = e^{-\frac{\|x_a - x_b\|^2}{h}} \quad (13)$$

$$K_h(x_a, x_b) = \left(1 + \frac{\|x_a - x_b\|^\lambda}{h}\right)^{-1} \quad (14)$$

$$K_h(x_a, x_b) = 1 - \frac{\|x_a - x_b\|^\lambda}{h} \quad (15)$$

In equations 13-15, the vector difference, or "norm", of the two vectors is used; generally this is the 2-norm, but could also be the 1-norm or p-norm. The parameter h is generally a constant that is often called the "bandwidth" of the kernel, and affects the size of the "field" over which each exemplar returns a significant result. The power λ may also be used, but can be set equal to one. It is possible to employ a different h and λ for each exemplar $x_i$. By one approach, when using kernels employing the vector difference or norm, the measured data should first be normalized to a range of 0 to 1 (or other selected range), for example, by adding to or subtracting from all sensor values the value of the minimum reading of that sensor data set, and then dividing all results by the range for that sensor. Alternatively, the data can be normalized by converting it to zero-centered mean data with a standard deviation set to one (or some other constant). Furthermore, a kernel/similarity operator according to the invention can also be defined in terms of the elements of the observations, that is, a similarity is determined in each dimension of the vectors, and those individual elemental similarities are combined in some fashion to provide an overall vector similarity. Typically, this may be as simple as averaging the elemental similarities for the kernel comparison of any two vectors x and y:

$$K(x, y) = \frac{1}{L}\sum_{m=1}^{L} K(x_m, y_m) \quad (16)$$

Then, elemental similarity operators that may be used according to the invention include, without limitation:

$$K_h(x_m, y_m) = e^{-\frac{|x_m - y_m|^2}{h}} \quad (17)$$

$$K_h(x_m, y_m) = \left(1 + \frac{|x_m - y_m|^\lambda}{h}\right)^{-1} \quad (18)$$

$$K_h(x_m, y_m) = 1 - \frac{|x_m - y_m|^\lambda}{h} \quad (19)$$

The bandwidth h may be selected in the case of elemental kernels such as those shown above, to be some kind of measure of the expected range of the mth parameter of the observation vectors. This could be determined, for example, by finding the difference between the maximum value and minimum value of a parameter across all exemplars. Alternatively, it can be set using domain knowledge irrespective of the data present in the exemplars or reference vectors. Furthermore, it should be noted with respect to both the vector and elemental kernels that use a difference function, if the difference divided by the bandwidth is greater than 1, it can be set equal to one, resulting in a kernel value of zero for equations 14, 15, 18 and 19, for example. Also, it can readily be seen that the kernel or similarity operator can be modified by the addition or multiplication of different constants, in place of one, h, λ, and so on. Trigonometric functions may also be used, for example:

$$K_h(x_m, y_m) = \left(1 + \sin\left(\frac{\pi}{2h}|x_m - y_m|\right)\right)^{-1} \quad (19.1)$$

In one form, the similarity operator or kernel generally provides a similarity score for the comparison of two identically-dimensioned vectors, which similarity score:
1. Lies in a scalar range, the range being bounded at each end;
2. Has a value of one (or other selected value) at one of the bounded ends, if the two vectors are identical;
3. Changes monotonically over the scalar range; and
4. Has an absolute value that increases as the two vectors approach being identical.

All of the above methods for modeling use the aforementioned kernel-based approach and use a reference library of the exemplars. The exemplars (also called reference observations or reference vectors) represent "normal" behavior of the modeled system. Optionally, the available reference data can be down-selected to provide a characteristic subset to serve as the library of exemplars, in which case a number of techniques for "training" the kernel-based model can be employed. In this case, the down-selected library itself may form the matrix D used in the equations above. According to one training method, at least those observations are included in the library that have a highest or lowest value for a given parameter across all available reference observations. This can be supplemented with a random selection of additional observations, or a selection chosen to faithfully represent the scatter or clustering of the data. Alternatively, the reference data may be clustered, and representative "centroids" of the clusters formed as new, artificially generated exemplars, which then form the library. A wide variety of techniques are known in the art for selecting the observations to comprise the library of exemplars. Thus, at least in general terms for this case, the matrix D remains the same in equation (7) for all of the input vectors $x_{in}$, unless the library is changed (i.e. such as when the library is updated).

In an alternative arrangement for both the inferential and autoassociative forms of the empirical kernel-based model, matrix D can be reconfigured for each input vector $x_{in}$ so that the model can be generated "on-the-fly" based on qualities of the input observation, and drawing from a large set of learned observations, i.e., a reference set. One example of this is described in U.S. Pat. No. 7,403,869. This process is called localization. Accordingly, the inferential and autoassociative forms of kernel-based modeling can be carried out using a set of learned observations $x_i$ (matrix D) that are selected from a larger set of reference observations, based on the input observation. Kernel-based models are exceptionally well suited for this kind of localization because they are trained in one pass and can be updated rapidly. Advantageously, by drawing on a large set of candidate exemplars, but selecting a subset with each new input observation for purposes of generating the estimate, the speed of the modeling calculation can be reduced and the robustness of the model improved, while still well characterizing the dynamics of the system being modeled.

For the monitoring system 10, the localization module 28 can use a variety of criteria to constitute the localized matrix membership for collection D(t), including the application of the similarity operator itself. In general, however, the input observation 32, comprising the set of parameters or derived features that are to be estimated by the model as part of the monitoring process, are provided to the localization module 28, which accesses a large store of exemplar observations in the form of reference library 18, in order to select a subset of those exemplar observations to build the model. Localization module 28 selects exemplars from library 18 that are relevant to the input observation 32, which can be a much smaller set than the size of the library. By way of example, the reference library 18 might comprise 100,000 exemplar observations that characterize the normal dynamics of the system represented by the parameters being modeled, but the localization module 28 might select only a few dozen observations to build a localized model in response to receiving the input observation 32. The selected exemplar observations are then provided to the now localized model 14. In the vector-based system, these observations then comprise the set of learned exemplars $x_i$ for purposes of the kernel-based estimator (also shown as D in connection with SBM above). The estimate observation $x_{est}$ is then generated accordingly as described above. For the monitoring system 10, the selected learned exemplars each may represent a vector at time point $t_p$, such that a sequential pattern matrix is built for each vector at $t_p$ to form the collection D(t) described below. As the next input observation 32 is presented to the monitoring system 10, the process is repeated, with selection of a new and possibly different subset of exemplars from library 18, based on the new input observation.

According to one approach, the input observation 32 can be compared to the reference library 18 of learned observations, on the basis of a clustering technique. Accordingly, the exemplar observations in library 18 are clustered using any of a number of techniques known in the art for clustering vectors, and the localization module 28 identifies which cluster the input observation 32 is closest to, and selects the member exemplars of that cluster to be the localized observations provided to the localized model 14. Suitable clustering methods include k-means and fuzzy c-means clustering, or a self-organizing map neural network.

According to another approach, a kernel can be used to compare the input observation 32 to each exemplar in the library 18 to yield a similarity value that provides a ranking of the reference observations vis-à-vis the input observation. Then, a certain top fraction of them can be included in the localized collection D(t). As a further refinement of this localization aspect, observations in the ranked list of all reference observations are included in localized collection D(t) to the extent one of their component elements provides a value that "brackets" the corresponding value in the input vector. For example, a search down the ranked list is performed until values in the input vector are bracketed on both the low and high side by a value in one of the reference observations. These "bracketing" observations are then included in localized collection D(t) even if other observations in library 18 have higher similarity to the input. The search continues until all input values in the input vector are bracketed, until a user-selectable maximum limit of vectors for building sequential pattern matrices to include in collection D(t) is reached, or until there are no further reference observations that have sufficiently high similarity to the input to surpass a similarity threshold for inclusion.

Other modifications in determining the membership of localized collection D(t) are contemplated. By way of example, in both the clustering selection method and the similarity selection method described above, the set of elements, i.e., parameters used to comprise the vectors that are clustered or compared with the kernel for similarity, may not be identical to those used to generate the model and the estimate, but may instead be a subset, or be a partially overlapping set of parameters. As mentioned above, an additional step for the system 10 and model 14 is then performed to generate the collection D(t). Specifically, once the vectors (referred to as primary vectors $t_p$) are selected for inclusion in collection D(t), other temporally related vectors (whether looking forward or looking back in time) are selected for each primary vector to form a learned sequential pattern matrix for each primary vector and included in the collection D(t). The process for choosing the temporally related vectors is explained below. It will be understood that the localization by the module 28 can be applied to any of the three-dimensional collections of learned sequential pattern matrices described in detail below.

Turning now to the incorporation of the time domain information into the model 14, by one approach for the monitoring system 10 described herein, the above kernel function, which operates to compare the similarity of two vectors, is replaced by an extended kernel function K that operates on two identically-dimensioned arrays:

$$\vec{K}(\vec{X}_{new}, \vec{X}_i) \quad (20)$$

where $X_{new}$ is an input pattern array and $X_i$ is a learned pattern array. A pattern array or pattern matrix is composed of a sequence of temporally-related vectors, where each of its constituent vectors contains sensor measurements from a distinct moment in time. One of the vectors in a pattern array is designated the primary vector, and the time at which its data is derived is designated the current primary time point $t_p$. The other vectors are associated with time points that relate to the primary time point in a systematic manner.

In one form, the primary time point is the most recent of the time points that compose a sequence of the time-ordered points (or time-ordered vectors that represent those time points) in the pattern array. By one approach, the other time points are equally-spaced and precede the primary time point by integer multiples of a time step $\Delta t$ providing uniform time intervals between the time points. For a given number of samples $n_{lb}$, the time points form an ordered sequence: $(t_p - n_{lb}\Delta t, t_p - (n_{lb}-1)\Delta t, \ldots, t_p - 2\Delta t, t_p - \Delta t, t_p)$. The sequence of time points defines a look-back pattern array, $$\vec{X}(t_p) = [x(t_p - n_{lb}\Delta t), x(t_p - (n_{lb}-1)\Delta t), \ldots x(t_p - 2\Delta t), x(t_p - \Delta t), x(t_p)] \quad (21)$$

Figure 6:
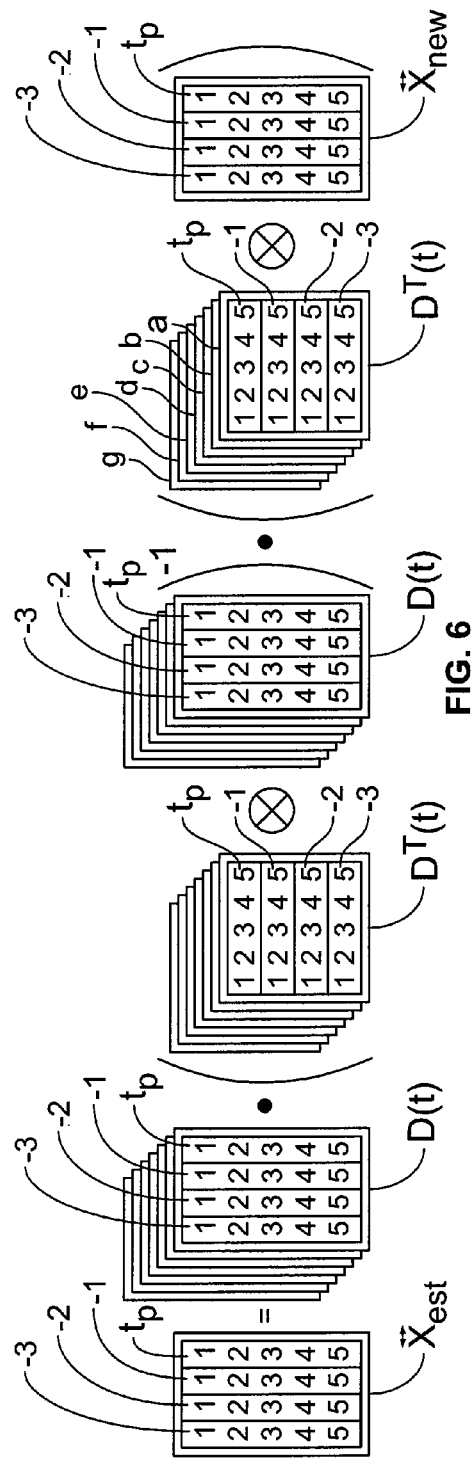
FIG. 6 is a schematic diagram of the autoassociative sequential similarity based modeling equation.

As shown in FIG. 6, the primary vector $t_p$ is positioned as the right-most column of each pattern array, and the other ($n_{lb}$) data vectors are column vectors that are located to the left of the primary vector $t_p$. The rows of the pattern arrays correspond to short segments of the time-varying signals from the modeled sensors.

By using look-back pattern arrays, the extended kernel function in equation (20) can be applied to real-time system monitoring. The primary vector $t_p$ (which means the vector at time point $t_p$) in the input pattern array $X_{new}$ contains system data from the current point in time, and the remainder of the array consists of data vectors from recent time points in the past. Thus, not only does the input pattern array contain the current, albeit static, vector used by traditional kernel methods, but it also contains a sequence of vectors that express the developing, dynamic behavior of the monitored system. As system time progresses, new input pattern arrays are formed which contain much of the same data as preceding arrays except that new primary vectors appear in the right-most position of the arrays, and the oldest vectors are dropped from the left-most position. Thus, a single input vector representing a single instant in time will be used in multiple input pattern arrays $X_{new}$, and assuming the vectors are used in sequence, the vectors will be used the same number of times as there are vectors in the array. In this manner, the input pattern array describes a moving window of patterns through time. Here, moving window means a set or group of a fixed number of vectors in chronological order that changes which vectors are included in the set as the window moves along the timeline or along a sequence of time-ordered sensor value vectors.

The pattern array defined in equation (21) above contains $n_{lb}$ data vectors that span a window in time equal to $n_{lb} * \Delta t$. The data vectors are equally-spaced in time for this example. Another way to say this is that each input pattern array or matrix is defined only by uniform time intervals between time points represented by the input vectors within the input pattern array $X_{new}$.

Alternatively, a kernel can be used to compare pattern arrays that span differing lengths of time. If a pattern array contains data from time points that are spaced by one time step $\Delta t_1$ (say one second apart for example), and if the time points of another pattern array differ by a second time step $\Delta t_2$ (say ten seconds apart for example), then the pattern arrays will span two differing time windows: $n_{lb} * \Delta t_1$ and $n_{lb} * \Delta t_2$ so that there are two pattern arrays that represent different durations. In one form, as long as the pattern arrays contain the same number of vectors even though one pattern array may have different time intervals between the vectors (or time points) than in another pattern array, a kernel function that matches vectors from the same positions in the two pattern arrays (such as right-most with right-most, second from right with second from right, and onto left-most with left-most) will be capable of operating across varying time scales. Thus, in one example, the matrices may extend across differently spaced time points so that the time interval spacing could correspond to the harmonics (1/f) of the peaks in a spectral time signal. It also will be understood that this difference in time period or duration covered by the pattern arrays may be used between the learned pattern arrays and input pattern arrays, from input pattern array to input pattern array, from learned pattern array to learned pattern array, or any combination of these as long as each vector in the input pattern array has a corresponding learned exemplar in the learned pattern arrays (or in other words, both learned and input matrices have the same number of vectors).

According to another example, a kernel can be used to compare pattern arrays whose pattern vectors are not equally-spaced in time. Instead of spacing pattern vectors by a constant time interval or step, the time step can vary by position within the pattern array. By using small time steps for most recent vectors (positioned near the right side of the array) and larger time steps for the older vectors (positioned near the left side of the array), the kernel function will focus attention on the most recent changes while still retaining some effect from changes in the more distant past.

Referring again to FIG. 1, an additional filtering step may be performed on the pattern arrays by a filter module 106 prior to analysis by the kernel function (equation (21)). When the filtering is used, it is performed on both the reference vectors and the input vectors to avoid any substantial, unintentional mismatch between the two resulting signal values to be used for generating estimates. In the filtering step, each of the time-varying sensor segments (rows of a pattern array) are processed by a filtering algorithm to either smooth the data in the segment or to calculate statistical features from the data. Smoothing algorithms, such as moving window averaging, cubic spline filtering, or Savitsky-Golay filtering, capture important trends in the original signal, but reduce the noise in the signal. Since smoothing algorithms produce smoothed values for each of the elements in the input signal, they produce a pattern array that has the same dimensions as the original pattern array of sensor data. Alternately, the filtering step can consist of the application of one or more feature extraction algorithms to calculate statistical features of the data in each signal. These features may include the mean, variance, or time derivatives of the signal data. As long as the same number of feature extraction algorithms is applied to the data in the pattern arrays, the number of data vectors in the original pattern array can vary.

As described above, there are numerous methods in which pattern arrays are used to represent temporal information from the system being modeled. These methods include, but are not limited to, sequences of data vectors from equally-spaced time points, sequences of data vectors that span differing time periods such that the pattern arrays have varying durations, and sequences whose data vectors are not equally-spaced in time. The input pattern array may have different intervals than the reference pattern arrays, or they may be the same. In addition, the pattern sequences can be filtered by smoothing or feature extraction algorithms. The only limitation on the form of the pattern arrays or the arrays produced by filtering algorithms are that the two arrays processed by the extended kernel function (equation 20) be identically-dimensioned (i.e., having the same number of rows and columns).

Similar to the vector-based kernel function described above, the extended kernel function returns a scalar value or similarity measure, although here, the scalar value represents the similarity between two arrays rather than two vectors. The extended kernel function produces a similarity score that displays the same properties as the vector-based kernel function enumerated above. Namely, the similarity score is a scalar whose range is bounded; has a value of one (or other selected value) for one of the bounds when the two arrays are identical; varies monotonically over the range; and whose absolute value increases as the two arrays approach being identical. In addition, the extended kernel function operates on the matching temporal components of the two arrays. This means, for the example of two look-back pattern arrays, that the extended kernel function finds the similarity between the two primary vectors $t_p$ from the reference and input pattern arrays respectively, then on the two data vectors to the left of the primary vectors −1, and so forth across the preceding vectors in the arrays.

One example of an extended kernel function is based on the similarity operator described in U.S. Pat. No. 6,952,662. Letting $X_{new}$ and $X_i$ be two identically-dimensioned pattern arrays, containing data from $n_{sens}$ sensors (or parameters) and spanning $n_{lb}$ sequential time points, the extended kernel function is written as follows:

$$S(\overline{X}_{new}, \overline{X}_i) = \frac{1}{1 + \frac{1}{\rho}\left(\frac{1}{n_{sens}}\sum_{j=1}^{n_{sens}}\theta_j(t)\right)^\lambda} \quad (22)$$

where $\rho$ and $\lambda$ are constants. The time-dependent function $\theta(t)$ in equation 22 operates on the temporal elements of the pattern arrays, matching data from the same time point vectors in the two arrays. One means of accomplishing this temporal data matching is to use a weighted average of the temporal data for a given sensor j:

$$\theta_j(t) = \left[\sum_{k=1}^{n_{lb}}(W_k s_{j,k})\right] \bigg/ \sum_{k=1}^{n_{lb}} W_k \quad (23)$$

The similarity $(s_{j,k})$ between data elements for a given sensor j is defined as the absolute difference of the data elements normalized by the range of normal operating data for a sensor $range_j$. Thus, the time-dependent similarity function $\theta(t)$ for a given sensor's data is:

$$\theta_j(t) = \left[\sum_{k=1}^{n_{lb}}\left(\frac{W_k|\overline{X}_{new,j,k} - \overline{X}_{i,j,k}|}{range_j}\right)\right] \bigg/ \sum_{k=1}^{n_{lb}} W_k \quad (24)$$

Combining equations 22 and 24, produces an extended kernel function for two pattern arrays:

$$S(\overline{X}_{new}, \overline{X}_i) = \frac{1}{1 + \frac{1}{\rho}\left[\frac{1}{n_{sens}}\sum_{j=1}^{n_{sens}}\left(\frac{\sum_{k=1}^{n_{lb}}\left(\frac{W_k|\overline{X}_{new,j,k} - \overline{X}_{i,j,k}|}{range_j}\right)}{\sum_{k=1}^{n_{lb}} W_k}\right)\right]^\lambda} \quad (25)$$

Another example of an extended kernel function is based on the similarity operator described in U.S. Pat. No. 7,373,283. Again letting $X_{new}$ and $X_i$ be two identically-dimensioned pattern arrays, containing data from $n_{sens}$ sensors and spanning $n_{lb}$ sequential time points, this second extended kernel function is written as follows:

$$S(\overline{X}_{new}, \overline{X}_i) = \frac{1}{n_{sens}}\sum_{j=1}^{n_{sens}}\left[\frac{1}{1 + \frac{1}{\rho}(\theta_j(t))^\lambda}\right] \quad (26)$$

This extended kernel function utilizes the same time-dependent function $\theta(t)$ as defined by equations 23 and 24 to compare the temporal data of a given sensor in the two pattern matrices:

$$S(\overline{X}_{new}, \overline{X}_i) = \frac{1}{n_{sens}}\sum_{j=1}^{n_{sens}}\left[\frac{1}{1 + \frac{1}{\rho}\left(\frac{\sum_{k=1}^{n_{lb}}\left(\frac{W_k|\overline{X}_{new,j,k} - \overline{X}_{i,j,k}|}{range_j}\right)}{\sum_{k=1}^{n_{lb}} W_k}\right)^\lambda}\right] \quad (27)$$

While referring to FIG. 6, the two extended kernel functions (equations 25 and 27) differ only in how they aggregate information from the modeled sensors, with the first equation representing the elemental form of a kernel function, and the second equation representing the vector difference form (such as 1-norm) of a kernel function. Both equations utilize weighted averaging to account for differences between the segments of time-varying signals in the two arrays $X_{new}$ and $X_i$. Specifically, for both example equations 25 and 27, and for each sequential learned pattern matrix a to g, the absolute difference is calculated for each corresponding pair of learned and input values. The values correspond when they represent (1) the same sensor (or parameter) and (2) either the same time point within the pattern array (such as both values being from the primary time $t_p$) or the same position relative to the other vectors in the array (such as when both values are on vectors that are second from the right within the pattern array). The absolute differences from the pairs of learned and input values are combined via weighted averaging to obtain a resulting single average value for the particular sensor. This is repeated for each sensor or parameter (1 to 5) represented by the pattern matrices a to g and pattern arrays $X_{new}$ so that there is one resulting average scalar for each sensor/parameter in the weighted averaging step.

Then, in the first extended kernel function (equation 25), the results from the weighted averaging step are in turn averaged across all sensors to produce a scalar value for the array-to-array comparison. Finally, this scalar value is transformed into a value that adheres to the properties of a similarity score as described above so that it falls within a range of zero to one for example, with one meaning identical. This process is then repeated for each learned sequential pattern matrix a to g in the three-dimensional collection D(t). In the second extended kernel function (equation 27), the results from the weighted averaging step are converted into similarity scores right away, one for each sensor. Then this vector of similarity scores is averaged so that a single similarity score is returned by the function for each learned sequential pattern matrix a to g in the three-dimensional collection D(t).

When used within context of similarity-based modeling, the extended kernel functions described above can also be termed extended similarity operators without loss of generality. The notation used in the above equations ($S(X_{new}, X_i)$) can also be written using the traditional similarity operator symbol ($X_{new} \otimes X_i$).

Extended versions of other vector-based kernel functions defined above (for example, equations 13 through 20) can be constructed by using weighted averaging to match temporal data from the same time points in two sequential pattern arrays. For instance, letting $X_{new}$ and $X_i$ be two identically-dimensioned pattern arrays, containing data from $n_{sens}$ sensors and spanning $n_{lb}$ sequential time points, an extended version of the kernel function defined in equation 16, using the elemental similarity operator of equation 17, is:

$$K_h(\vec{X}_{new}, \vec{X}_i) = \frac{1}{n_{sens}} \sum_{j=1}^{n_{sens}} \left[ \exp\left(-\frac{1}{h}\left[\frac{\sum_{k=1}^{n_{lb}} w_k |\vec{X}_{new;j,k} - \vec{X}_{i;j,k}|}{\sum_{k=1}^{n_{lb}} w_k}\right]^2\right)\right] \quad (28)$$

Weighted averaging (equation 22) is used to account for differences between segments of the time-varying signals in pattern arrays since the weights can be selected such that more recent data are more heavily weighted than outdated data. Thus, data from the primary time point $t_p$ are typically given the highest weight, with data from preceding time points (equation 21) given ever-decreasing weights. Numerous schemes can be used to define the weights, such as having them decline linearly or exponentially with time relative to the primary time point.

It will be understood that various other time-dependent functions θ(t) can be used to match data from sequential time points in two segments of time-varying signals. Such methods include, but are not limited to, other weighted norms (2-norm and p-norm) and maximum, minimum, or median difference. All that is required of the function is that it returns a scalar value that is minimized (a value of 0) if the two sequences are identical and increases in value as the sequences become more different.

In order to combine the concept of sequential pattern arrays with an extended similarity operator (for example, equation 25 or 27) in the autoassociative form of SBM (equation 7), the concept of the vector-based learned vector matrix D is extended. In the standard form of SBM described above, the learned vector matrix consists of a set of learned exemplars (vectors) selected from various points in time during periods of normal operation. Letting the time points from which these vectors are selected represent primary time points, each learned vector can be expanded into a learned sequential pattern matrix by collecting data from a sequence of time points that precede each primary time point. In this manner, the learned vector matrix D is expanded into a collection of learned sequential pattern matrices D(t). This collection of learned pattern matrices forms a three-dimensional matrix, wherein the dimensions represent the modeled sensors or parameters in a first dimension, the learned exemplars (vectors) from various primary time points in a second dimension, and time relative to the primary time points in a third dimension.

The training methods described above that are used for constructing the learned vector matrix used in vector-based forms of SBM can be utilized to create the three-dimensional collection of learned sequential pattern matrices D(t) required by the sequential pattern forms of SBM. This is accomplished by augmenting each reference vector selected by a training algorithm with reference vectors from preceding time points to construct a sequential pattern matrix. The collection of learned pattern matrices, one for each reference vector selected by a training algorithm, is drawn from reference library 18 of exemplars which represents "normal" behavior of the modeled system. If the time-inferential form of sequential SBM (described below) is used, then additional vectors from succeeding time points are added to each sequential pattern matrix.

The training methods that are used for the vector-based forms of SBM select exemplars (vectors) from various points in time during periods of normal operation, without regard to the time domain information inherent in the reference data. In the sequential pattern array forms of SBM, that time domain information is supplied by augmenting each of the selected exemplars with data vectors from a sequence of time points that immediately precede and (possibly) succeed the primary time points. In an alternative process for building and localizing the collection D(t) of sequential learned pattern matrices while factoring in the time domain information, each input pattern array may be compared to every sequence of reference vectors that is equal in number (namely, $n_{lb}+1$) to that in the input pattern array. The comparison is accomplished by using an extended form of the similarity operator (for example, equation 25 or 27) to identify those sequences of reference vectors that are most similar to the input pattern array. Each of the identified sequences of reference vectors forms one of the sequential learned pattern matrices in the collection D(t). Whatever the selection process, it is possible for a training method to select exemplars from primary time points that are quite near to one another. When two exemplars are selected from nearby primary time points, the corresponding sequential pattern matrices may contain data vectors in common.

Referring to FIG. 6, equation 7 is shown with an input pattern array $X_{new}$ and a three-dimensional collection of learned sequential pattern matrices D(t). The input pattern array $X_{new}$ may also be referred to as the current or actual pattern array or matrix since it includes the vector $t_p$ representing a current instant in time, and in contrast to the learned pattern matrices in D(t). In the illustrated example, the input pattern array $X_{new}$ includes four vectors where vector $t_p$ is the last (right-most) vector in the array. The other vectors are numbered as −3 to −1 referring to the number of time intervals before $t_p$ for simplicity. Thus, it will be understood that vector −3 on FIG. 6 represents the same thing as $(t_p - n_{lb}\Delta t)$ where $n_{lb}=3$. As shown in FIG. 6, the three dimensions of the collection of learned sequential pattern matrices (modeled sensors, primary time points, and pattern sequences) are depicted as follows: the numbers 1 through 5 represent data from five modeled sensors, the four columns (or vectors) of numbers represent four sequential time points, and the seven layered rectangles each represent a sequential pattern matrix a to g each with a primary time point $t_p$ selected from various periods of normal operation. The three-dimensional collection of learned sequential pattern matrices D(t) contains the seven sequential pattern matrices a to g. Thus, each sequential pattern matrix a to g comprises data from five sensors and four sequential points in time, and has the same dimensions as the input pattern matrix $X_{new}$. For comparison, another way to visualize the difference between the prior vector-based equation with a two-dimensional matrix D (FIG. 3) and the three-dimensional collection of learned sequential pattern matrices D(t) (FIG. 6) is that the prior two-dimensional array would merely have been formed by a single matrix cutting across the seven sequential pattern arrays a to g to include only the $t_p$ vectors from the three-dimensional collection D(t).

In the right-most bracket in FIG. 6, the extended similarity operator ($\otimes$) calculates the similarity between the input pattern array $X_{new}$ and the seven learned sequential pattern matrices a to g as explained above. In the example of FIG. 6, and using the weighted averaging step from equations 25 or 27, the model compares the time-varying signal for sensor 1 in sequential pattern matrix a to the time-varying signal for sensor 1 in the input pattern array $X_{new}$ to obtain a single average value for sensor 1. This is repeated for sensors 2-5 until one average value is provided for each sensor. Then, these scalar values (or similarity scores for equation 27) are averaged to determine a single similarity measure for sequential pattern matrix a. This is then repeated for each sequential pattern matrix b to g, returning a similarity vector containing seven similarity scores, one similarity score for each learned sequential pattern matrix a to g.

The operation in the middle bracket produces a seven-by-seven square similarity matrix of similarity values, one for each combination of a pair of learned sequential pattern matrices a to g in collection D(t). Multiplication of the inverse of the resulting similarity matrix with the similarity vector produces a weight vector containing seven elements. In a final step, the weight vector is multiplied by the collection D(t) to create an estimate matrix $X_{est}$. In one form, the estimate matrix $X_{est}$ is the same size as the input pattern array $X_{new}$ so that it has an estimate vector that corresponds to each of the time periods represented by the input vectors in the input pattern arrays. In the present example of FIG. 6, the estimate matrix $X_{est}$ has an estimate vector for the current moment in time $t_p$ and for each of the three preceding time points −1 to −3 as if formed in a look-back window. The use of the estimate matrix $X_{est}$ is described in further detail below. It also should be noted that the preceding vectors grouped together with or without the current or primary vector may be called a look-back window anywhere herein, and the succeeding vectors grouped together with or without the current or primary vector may be called a look-ahead window explained below and anywhere herein.

Figure 7:
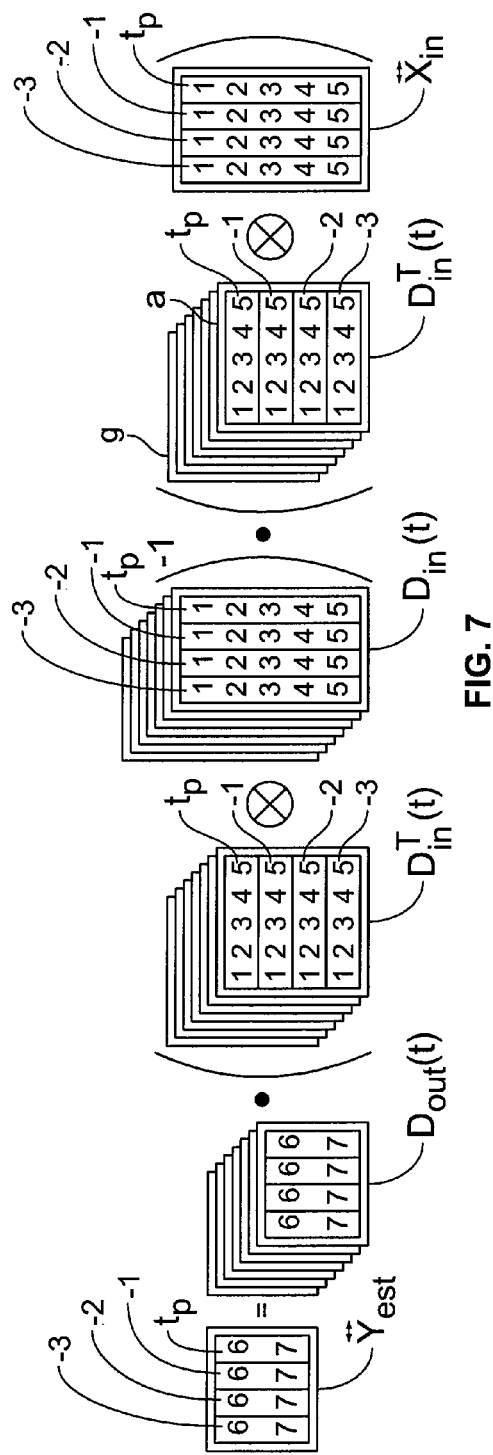
FIG. 7 is a schematic diagram of one form of the inferential sequential similarity based modeling equation that extrapolates in the modeled sensor dimension.

Extensions to the inferential form of SBM (equation 9) that utilize sequential pattern matrices with an extended similarity operator are readily apparent. Analogous to the vector-based form of inferential modeling, the three-dimensional collection of learned sequential pattern matrices $D_a(t)$ can be understood as an aggregate matrix containing learned sequential pattern matrices a to g that map to the sensor values in the input pattern array $X_i$ and sequential pattern matrices a to g that map to the inferred sensors $D_{out}(t)$. Referring to FIG. 7, equation 9 is shown with an input pattern array $X_{in}$ and a three-dimensional collection of learned sequential pattern matrices $D_{in}(t)$ with seven learned sequential pattern matrices a to g for the five input sensors 1 to 5. It is understood that the aggregate matrix $D_a(t)$ is a three-dimensional extension of the two-dimensional aggregate matrix defined in equation 10. Comparing the illustration in FIG. 7 to that in FIG. 6, the matrices within the brackets of both figures are identical except for how they are denoted. Therefore, the calculation of the weight vector for an inferential model proceeds in the same manner as that described above for an autoassociative model. Then, as in FIG. 4, the weight vector is multiplied by the learned sequential pattern array for the inferred sensors in FIG. 7 except that here matrix $D_{out}(t)$ is now a three-dimensional collection of learned sequential pattern matrices, and this step forms an estimate matrix $Y_{est}$ representing only the inferred sensors. As described above for the vector-based form of inferential modeling, the weight vector can also be multiplied by the full three-dimensional collection of learned sequential pattern matrices $D_a(t)$ that includes both $D_{in}(t)$ and $D_{out}(t)$ to generate estimate matrices for both input and inferred sensors (depicted in FIG. 8).

Inferential modeling enables calculation of estimates for sensors whose data are not included in the input data stream because reference data for these sensors are included in the three-dimensional collection of learned sequential pattern matrices $D_a(t)$ or $D_{out}(t)$. Conceptually, an inferential model extrapolates along the dimension of the modeled sensors. It is also possible to create an inferential model that extrapolates in the time dimension. This can be understood by revisiting the concept of the primary time point and the look-back window of equation 21. The time points in the look-back window precede the primary time point, meaning that they lie in the past relative to the primary time. One can also define a look-ahead window, constructed of time points that succeed the primary time. The time points in a look-ahead window are in the future relative to the primary time. Consider an ordered sequence of time points composed of a given number $(n_{lb})$ of time points that precede the primary time point and a given number $(n_{la})$ of time points that succeed the primary time point: $(t_p-n_{lb}\Delta t, t_p-(n_{lb}-1)\Delta t, \ldots, t_p-2\Delta t, t_p-\Delta t, t_p, t_p+\Delta t, t_p+2\Delta t, \ldots, t_p+(n_{la}-1)\Delta t, t_p+n_{la}\Delta t)$. The sequence of time points defines a pattern array that contains both look-back and look-ahead data, $$\vec{X}(t_p) = \begin{bmatrix} x(t_p - n_{lb}\Delta t), x(t_p - (n_{lb}-1)\Delta t), \ldots x(t_p - 2\Delta t), x(t_p - \Delta t), x(t_p), \\ x(t_p + \Delta t), x(t_p + 2\Delta t), \ldots x(t_p + (n_{la}-1)\Delta t), x(t_p + n_{la}\Delta t) \end{bmatrix} \quad (29)$$

Figure 9:
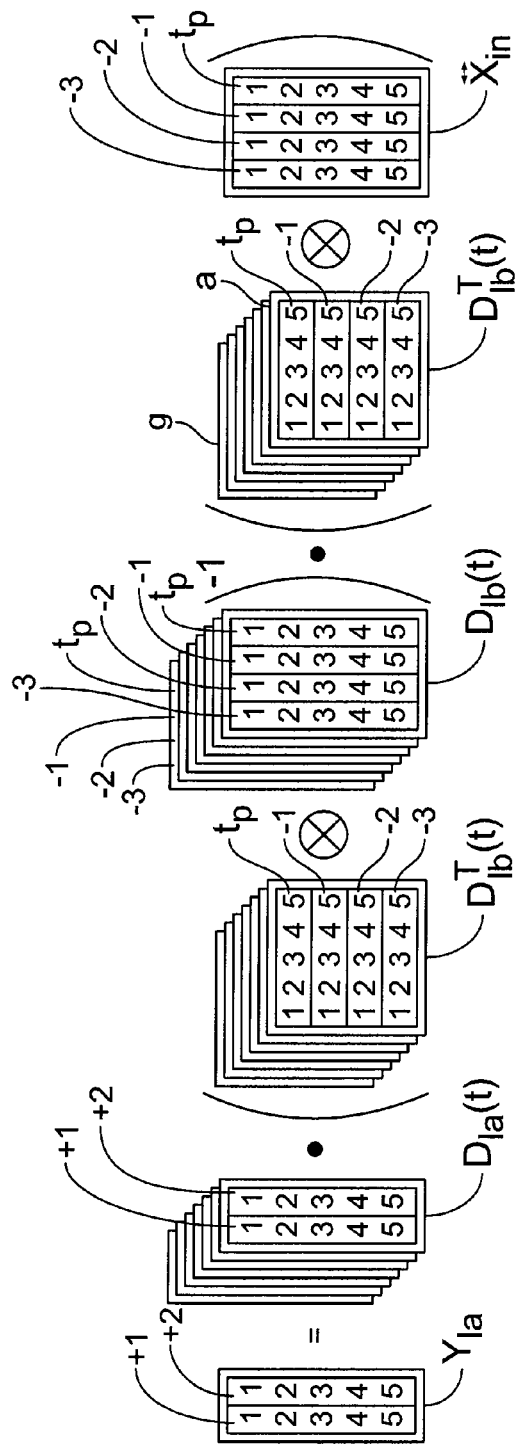
FIG. 9 is a schematic diagram of an inferential sequential similarity based modeling equation that extrapolates in the time dimension.

Referring to FIG. 9, an extension to the inferential form of SBM (equation 9) that supports extrapolation into the time dimension is produced if the three-dimensional collection of learned sequential pattern matrices $D_a(t)$ is created with sequential pattern matrices a to g that contain both look-back and look-ahead data. Since the input pattern array $X_{in}$ contains data only from the current time point and preceding time points (data from future time points do not exist yet), the collection of learned sequential pattern matrices $D_a(t)$ is an aggregate matrix composed of two sub-matrices separated along the time dimension. The first of these sub-matrices $D_{lb}(t)$ contains the data from the various primary time points and from the look-back time points. The second sub-matrix $D_{la}(t)$ contains the data from the look-ahead time points. Equation 9 is shown with an input pattern array $X_{in}$ of five input sensors and a look-back window of three time intervals between the time points $t_p$ to −3. The look-back portion or sub-matrix $D_{lb}(t)$ is a three-dimensional collection of learned sequential pattern matrices that contains data from five input sensors (1-5), seven primary time points each on its own sequential pattern matrix a to g, and four look-back time points or reference vectors $t_p$ to −3 on each sequential pattern matrix a to g. The look-ahead portion or sub-matrix $D_{la}(t)$ is a three-dimensional collection of learned sequential pattern matrices that contains data from five input sensors (1-5), seven learned sequential pattern matrices a to g each with its own primary time point, and two future or succeeding time points or vectors +1 and +2. The resulting weight vector, generated by the operations within the two sets of brackets, is multiplied by the look-ahead collection of learned sequential pattern matrices $D_{la}(t)$ to create an estimate matrix $Y_{la}$ that extrapolates in time. In this example, two extrapolated estimate vectors +1 and +2 are calculated for estimate matrix $Y_{la}$, representing the time points that are one and two time steps Δt into the future. As described above with the vector-based equation (FIG. 5), the weight vector can also be multiplied by the full collection of learned sequential pattern matrices $D_a(t)$ that includes both $D_{la}(t)$ and $D_{lb}(t)$ to generate estimate matrices $X_{lb}$ and $Y_{la}$ within an estimate matrix $XY_{e1}$ that contains estimate data for past, current, and future time points (depicted in FIG. 10).

Figure 8:
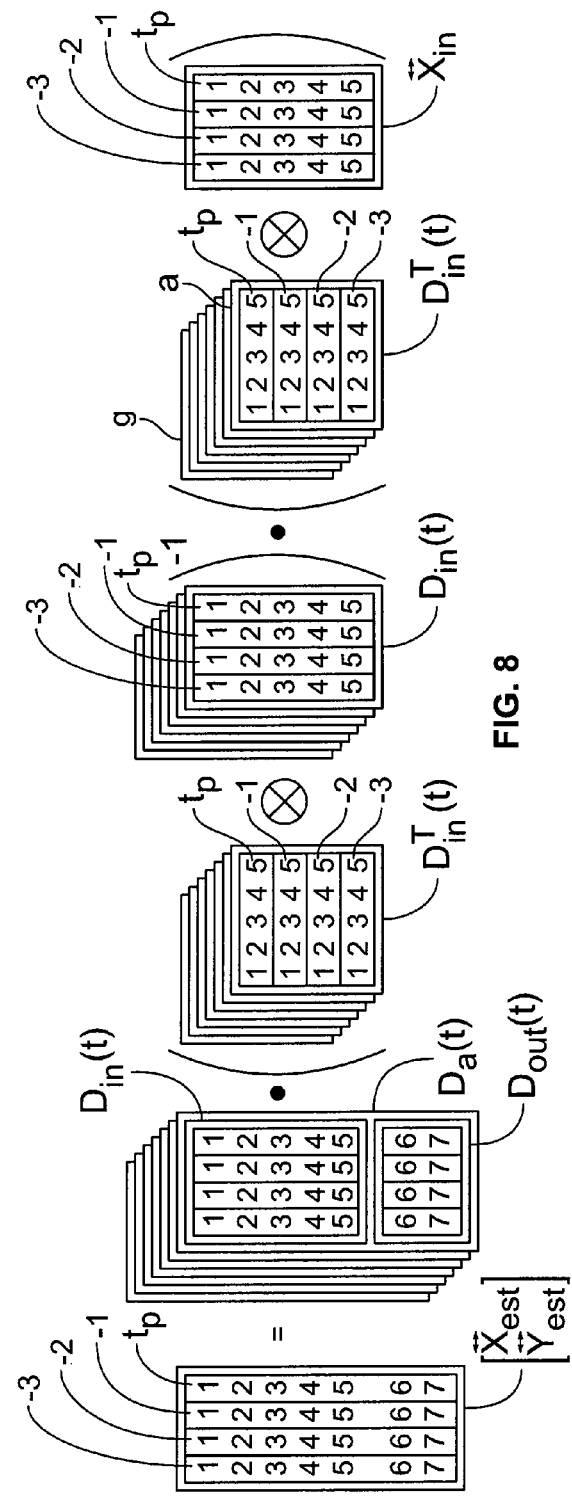
FIG. 8 is a schematic diagram of another form of the inferential sequential similarity based modeling equation that extrapolates in the modeled sensor dimension.
Figure 10:
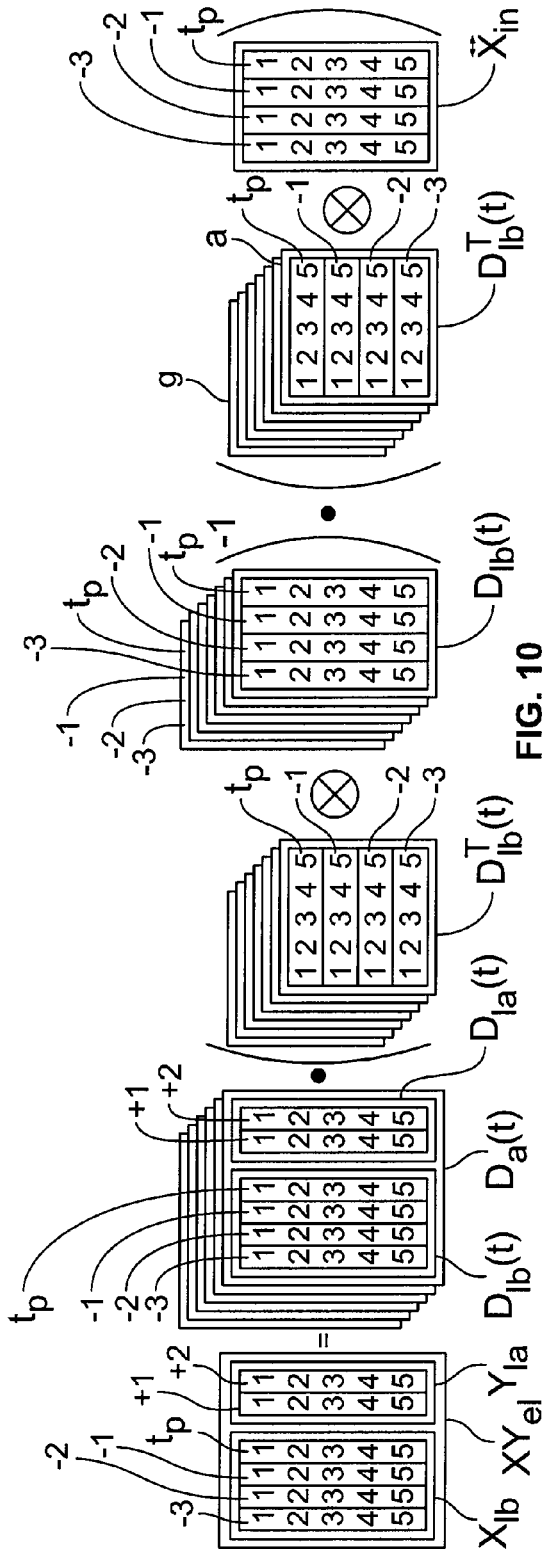
FIG. 10 is a schematic diagram of an inferential sequential similarity based modeling equation that extrapolates in the time dimension.
Figure 11:
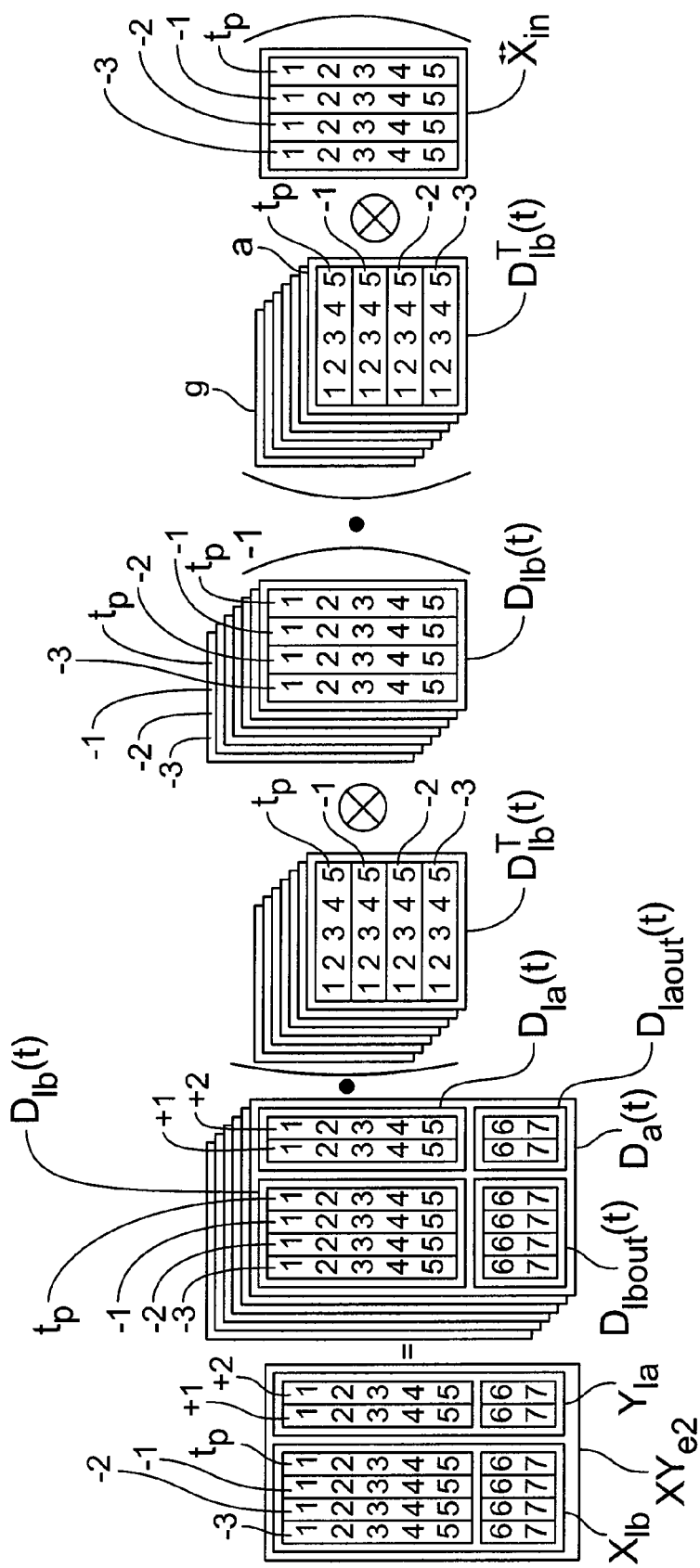
FIG. 11 is a schematic diagram of an inferential sequential similarity based modeling equation that extrapolates in the time dimension and the sensor dimension.

Comparing the illustrations in FIGS. 9 and 10 to those in FIGS. 7 and 8, the matrix calculations within the brackets of all four figures are identical. This means that the calculation of the weight vector for an inferential model that extrapolates in the time dimension is identical to that for an inferential model that extrapolates along the dimension of the modeled sensors. The two forms of inferential modeling differ only by the data that are included in the full collection of learned sequential pattern matrices. A model that includes data for time points that are in the future relative to the primary time points extrapolates into the future. A model that includes data for sensors that are not in the input data stream extrapolates into these sensors. Referring to FIG. 11, an inferential model that extrapolates into both the time and modeled sensor dimensions is shown. Its three-dimensional collection of learned sequential pattern matrices $D_a(t)$ is an aggregate matrix composed of four sub-matrices separated along the modeled sensor and time dimensions. Its sub-matrices contain data for the look-back window of the input sensors $D_{lb}(t)$, data for the look-ahead window of the input sensors $D_{la}(t)$, data for the look-back window of the output (inferred) sensors $D_{lbout}(t)$, and data for the look-ahead window of the output (inferred) sensors $D_{laout}(t)$. The calculations generate estimate matrices $X_{lb}$ and $Y_{la}$ within an estimate matrix $XY_{e2}$ that contains estimate data for past, current, and future time points (depicted in FIG. 10) for both input and output (inferred) sensors.

Each of the various forms of kernel regression modeling with sequential pattern arrays described above produces an estimate matrix of model estimate data. In one example, estimate matrix $X_{est}$ is formed for each input pattern array $X_{new}$ (FIG. 6). As understood from the examples described above, in addition to the estimate vector corresponding to the current time point, the estimate matrix contains vectors for each of the time points in the look-back and/or look-ahead windows. The number of sequential vectors in the estimate matrix depends on the form of the modeling equation (autoassociative or inferential) and the number of time points $n_{lb}$ in the look-back window and the number of time points $n_{la}$ in the look-ahead window. As system time progresses, each fixed time point along the timeline accumulates multiple estimate vectors as the input pattern array reaches, moves through, and past the time point. The total number of estimate vectors that will be calculated for a fixed moment in time equals the total number of sequential patterns (vectors) in the sequential pattern matrix and analyzed by the model. For an autoassociative model or an inferential model that extrapolates along the sensor dimension, this total number is given by $n_{lb}+1$, corresponding to an estimate vector for each pattern in the look-back window and an estimate vector for the primary (current) time point. For an inferential model that extrapolates along the time dimension, this total number is given by $n_{lb}+1+n_{la}$, corresponding to an estimate vector for each pattern in the look-back and look-ahead windows and an estimate vector for the primary (current) time point.

Because multiple estimate vectors are calculated for a fixed point in time, utilizing sequential kernel regression models to feed algorithms for condition monitoring or diagnostics is complicated by the fact that many of these algorithms expect that only a single estimate vector exists for a time point. The simplest means of dealing with the multiple estimate vectors is to simply designate less than all of the multiple vectors in the estimate matrix as the source of the model estimates and to ignore any others. In one form, only one of the estimate vectors from each estimate matrix is selected for further diagnostic analysis. Typically, this means that the estimate vector in the estimate matrix selected for a fixed, arbitrary point in time $t_i$ while looking across multiple estimate matrices is the one generated when that time point becomes the current time point ($t_i=t_{cur}$) or in other words, the most recent time point ($t_p$ in the example estimate matrices of FIGS. 6 to 8). As the input pattern window moves past $t_i$, and $t_i$ becomes part of the look-back window to the new current time point, new estimate data calculated for $t_i$ are ignored. In other words, the older or preceding vectors relative to the current vector $t_p$ in the estimate matrix are ignored.

Other, more complex methods can be used to produce or select a single estimate vector for each fixed time point across multiple estimate matrices, while taking advantage of the information in the multiple vectors. Such methods include, but are not limited to, an average; weighted average; other weighted norms (2-norm and p-norm); maximum, minimum or median value, and so forth. The estimate vector chosen for diagnostic analysis could also be the vector with the greatest similarity to its corresponding input vector, and may use a similar similarity equation as that used to determine the weight vector. It will also be understood these methods can be applied to provide a single estimate vector for each estimate matrix to represent multiple sequential time points within the estimate matrix rather than a single fixed time point across multiple estimate matrices.

For an inferential model that extrapolates in the time dimension, a prognostic module 34 (FIG. 1) can use the future estimate matrix $X_{la}$ to feed prognostics algorithms, such as calculations of the remaining useful life of an asset (or to state it another way, to determine the future condition or operational state of the object being monitored). This is based on the fact that the sequence of extrapolated estimates of a modeled sensor is a trend-line that predicts the future behavior of the modeled sensor. As system time progresses and new input pattern arrays are formed containing new primary vectors, new future estimate matrices are calculated. Like the other kernel regression models described above, the new estimate matrices substantially overlap previous matrices, meaning that multiple estimate values are produced for each sensor at each time point.

Also similar to the other kernel regression models, the inferential time extrapolating model can use various methods devised to reduce the multiple estimate values that are calculated at a fixed time point to a single value suitable for trending of the sensor. The simplest method is to select the most-recently calculated estimate matrix to supply the estimate data at each of the time points in the look-ahead window. Specifically, for a fixed time point $t_i$ well into the future, an estimate vector will be generated for it when the look-ahead pattern window first reaches it: $t_i = t_{cur} + n_{la} * \Delta t$. At each succeeding time step as the look-ahead window passes through the fixed point, a new estimate vector is calculated for it, which replaces the last vector. Thus, all of the estimate vectors are used to build a trend line, and the results for each time point (or fixed point) represented by estimate vectors are constantly being updated by the more recent estimate values to correspond to vectors as they past through the look-ahead window used to build the estimate matrices.

Besides being simple, this approach produces sensor trends that react quickly to dynamic changes since only the most-recently calculated estimate matrix is used. Since estimate data in the trend-lines are replaced for each succeeding time step, the trends are susceptible to random fluctuations. This means that the trend value at a fixed time point can vary dramatically between successive time steps. Other more complex methods, such as average, weighted average, or other weighted norms, utilize two or more, or all, of the estimate values calculated at a fixed time point across multiple estimate matrices to produce a single estimate value for it. Trend lines produced by these methods are smoother, but less responsive to rapid dynamic changes. In addition to the above methods, which are designed to produce trend-lines representative of expected system behavior, other trend-lines can be produced that indicate the range of possible behaviors. For instance, a trend-line that connects the maximum estimate values at each future time point coupled with a trend-line connecting the minimum estimate values, bound the results produced by the model.

Returning again to FIG. 1, the full estimate matrix $X_{est}$ or a single representative estimate vector, as described above, is passed to differencing engine 20. The differencing engine subtracts the estimate matrix from the input pattern array ($X_{in}$ or $X_{new}$) or it subtracts the representative estimate vector from the current time point's input vector. Specifically, each selected estimate value from the estimate matrix is subtracted from a corresponding input value from the input pattern array. This array of residual vectors or a single representative residual vector is then provided to the alert module 22. Alert module 22 applies statistical tests to the residual data to determine whether the estimate and input data are statistically different. The alert module 22 performs any of a variety of tests to make the fault determination. This may include a rules engine for assessing rules logic using one or more residual values. The rules can be of any of a variety of commonly used rules, from simple univariate threshold measures, to multivariate and/or time series logic. Furthermore, the output of some rules may be the input to other rules, as for example when a simple threshold rule feeds into a windowed alert counting rule (e.g., x threshold alerts in y observations). Furthermore, statistical techniques may be used on the residual data to derive other measures and signals, which themselves can be input to the rules. Applicable statistical analyses can be selected from a wide variety of techniques known in the art, including but not limited to moving window statistics (means, medians, standard deviations, maximum, minimum, skewness, kurtosis, etc.), statistical hypothesis tests (for example, Sequential Probability Ratio Test (SPRT)), trending, and statistical process control (for example, CUSUM, S-chart).

The alert module 22 may determine that any differences between the estimate and input data is due to the normal operating conditions that were not encountered during training. In this case, sensor data indicative of the new operating conditions are provided to the optional adaptation module 30, which incorporates that data into the learning of model 14 via library 18, for example. In addition, adaptation module 30 may optionally perform its own automated tests on the data and/or residual analysis results to determine which input vectors or input arrays should be used to update the model 14.

The process of adapting a model comprises adding sensor data indicative of the new operating conditions to the set of reference data in the library H from which the original kernel-based model was "trained". In the simplest embodiment, all reference data are used as the model exemplars, and therefore adapting a model means adding the new sensor data to the exemplar set of the model. Since sequential kernel regression models operate on sequences of observation vectors by design, new operating data added to the reference data must consist of a sequence of observation vectors. The minimum number of vectors added during any adaptation event equals the total number of sequential patterns (vectors) analyzed by the model. As described above, this total number is given either by $n_{lb}+1$ for an autoassociative model or an inferential model that extrapolates along the sensor dimension, or by $n_{lb}+1+n_{la}$ for an inferential model that extrapolates along the time dimension. If a training method has been used to down-select the reference observations to a subset stored as "representative" of system dynamics as described above for forming the three-dimensional collection of learned sequential pattern matrices D(t), then the new sequence of observation vectors (or in other words the entire input pattern array) is added to the original reference dataset, and the down-selection technique is applied to derive a new representative exemplar set, which should then include representation of the new observations. It is also possible to merely add the new sequence to a down-selected set of learned pattern arrays, without rerunning the down-selection technique. Furthermore, in that case, it may be useful to remove some learned pattern arrays from the model so that they are effectively replaced by the new data, and the model is kept at a manageable size. The criteria for which old learned pattern arrays are removed can include clustering and similarity determinations using equations described above which compare the observations at the new primary time points to the observations at old primary time points and replace those sequential pattern arrays most like the new sequential pattern arrays.

To this point, the invention describes sequential kernel regression models that are trained with representative data from periods of normal operation. It has been shown that such models can be used to detect and diagnosis system faults. In addition, the time-inferential form of the invention produces models that can extrapolate system behavior into the future. But since the models are trained only with normal operating data, their utility as a fault progresses is limited as the system behavior departs further and further from normality.

To improve diagnostics and prognostics during developing faults, separate sequential kernel regression models that are trained with data collected during fault conditions (or failure mode reference data) can be utilized. These fault models are activated only after there is an indication that a fault is developing in the system. The fault indication can be provided by sequential models trained with normal system data, or by numerous other means; including, but not limited to, vector-based kernel regression models (for example, SBM), neural networks, k-means clustering models, and rule-based fault detection models. The fault models are trained with full transient histories of known fault events for the asset being monitored. These fault events need not have occurred on the actual asset from an earlier period in time, they can come from fault events that have occurred on other machinery that are substantially equivalent to the asset being monitored. The fault histories consist of all system data collected from the time at which the fault was first indicated to the final end state of the event, such as system failure or system shutdown.

It will be appreciated by those skilled in the art that modifications to the foregoing embodiments may be made in various aspects. Other variations clearly would also work, and are within the scope and spirit of the invention. The present invention is set forth with particularity in the appended claims. It is deemed that the spirit and scope of that invention encompasses such modifications and alterations to the embodiments herein as would be apparent to one of ordinary skill in the art and familiar with the teachings of the present application.

What is claimed is:

1. A monitoring system for determining the condition of an object, comprising:
    an empirical model operated by at least one processor and having reference data that indicates the normal operational state of the object, and input pattern arrays, each input pattern array having a plurality of time-ordered input vectors, each input vector having input values representing a plurality of parameters indicating the current condition of the object, the reference data being grouped in equal-sized and multi-dimensional training arrays, each of the training arrays being equal in size to a corresponding input multi-dimensional pattern array and each training array including a plurality of time-ordered reference vectors sequenced in time,
    the empirical model being configured to generate estimate values based on a calculation that uses an input pattern array and the reference data to determine a similarity measure between the input values and the reference data; and
    a differencing module comparing the estimate values to the corresponding input values so that resulting values from the comparison can be used to determine the condition of the object.

2. The system of claim 1, wherein at least one of the input vectors is in multiple input pattern arrays.

3. The system of claim 1, wherein each input pattern array represents a time period including a plurality of time points along a sequence of the input vectors representing the operational state of the object.

4. The system of claim 3, wherein each input pattern array represents a time period that is different than, but overlaps, the time period of at least one of the other input pattern arrays.

5. The system of claim 3, wherein each input pattern array has a current primary vector from the sequence of input vectors and representing the most recent time point within the input pattern array.

6. The system of claim 5 wherein the input vectors are selected for each input pattern array by moving a look-back window along the sequence, selecting the current primary vector, and selecting one or more older vectors that follow the primary vector along the sequence and fit within the window.

7. The system according to claim 6 wherein the older vectors are consecutive along the sequence.

8. The system according to claim 6 wherein the older vectors are not consecutive along the sequence.

9. The system according to claim 1 wherein time intervals between the time points represented by the input vectors within an input pattern array are uniform.

10. The system according to claim 1 wherein time intervals between the time points represent by the input vectors within an input pattern array are unequal.

11. The system according to claim 1 wherein time intervals between time points represented by the input vectors within an input pattern array are shorter between input vectors that are more recent than the time intervals between later input vectors within the same input pattern array.

12. The system according to claim 1 wherein the total duration represented by the input pattern arrays varies.

13. The system according to claim 1 wherein the calculation is based on an equation that comprises:

$$S(\vec{X}_{new}, \vec{X}_i) = \frac{1}{\left[1 + \frac{1}{\rho}\left[\frac{1}{n_{sens}}\sum_{j=1}^{n_{sens}}\left(\frac{\sum_{k=1}^{n_{lb}}\left(\frac{W_k|\vec{X}_{new,j,k} - \vec{X}_{i;j,k}|}{range_j}\right)}{\sum_{k=1}^{n_{lb}} W_k}\right)\right]\right]^\lambda}.$$

14. The system according to claim 1 wherein the calculation is based on an equation that comprises:

$$S(\vec{X}_{new}, \vec{X}_i) = \frac{1}{n_{sens}}\sum_{j=1}^{n_{sens}}\left[\frac{1}{1 + \frac{1}{\rho}\left(\frac{\sum_{k=1}^{n_{lb}}\left(\frac{W_k|\vec{X}_{new,j,k} - \vec{X}_{i;j,k}|}{range_j}\right)}{\sum_{k=1}^{n_{lb}} W_k}\right)^\lambda}\right].$$

15. The system of claim 1 wherein the similarity measure is a value on a bounded range that indicates an input value and reference value are identical at one end of the range and have no similarity at another end of the range.

16. The system of claim 1, wherein the reference data comprises at least one learned sequential pattern matrix, each learned sequential pattern matrix having a plurality of reference vectors, each reference vector having reference values representing a plurality of parameters.

17. The system of claim 16 wherein the reference data forms a three-dimensional collection of the learned sequential pattern matrices.

18. The system of claim 17 wherein the three-dimensional collection is defined by three dimensions representing the parameters along a first dimension, the learned sequential pattern matrices along a second dimension, and time represented by the reference vectors in a third dimension.

19. The system of claim 17 wherein each input pattern array is compared to each learned sequential pattern matrix in the three-dimensional collection to determine a similarity measure for each learned sequential pattern matrix.

20. The system of claim 17 herein each learned sequential pattern matrix represents a time period including time points represented by the reference vectors, wherein the time period is different than, but overlaps, the time period of at least some of the other learned sequential pattern matrices in the three-dimensional collection.

21. The system of claim 17 wherein the learned sequential pattern matrices have the same number of vectors as the input pattern arrays.

22. The system of claim 17 wherein the learned sequential pattern matrices represent the same time points as the input pattern arrays.

23. The system of claim 17 wherein the similarity between one of the learned sequential pattern matrices and one of the input pattern arrays is based on the similarity between corresponding reference and input values that represent the same vector position relative to the position of the other vectors represented within their respective array.

24. The system of claim 17 wherein the similarity between one of the learned sequential pattern matrices and one of the input pattern arrays comprises calculating an average scalar similarity value for each parameter represented by the arrays.

25. The system of claim 17 wherein at least some of the input pattern arrays represent a time period that is different than the time period represented by at least one of the learned sequential pattern matrices.

26. The system according to claim 17 wherein the time period represented by the learned sequential pattern matrices varies.

27. The system according to claim 1 wherein the empirical model is configured to generate the estimate values in the form of an estimate matrix having a plurality of estimate vectors.

28. The system of claim 27 wherein the estimate vectors in each estimate matrix corresponds to the time points represented by the input vectors in the input pattern arrays.

29. The system of claim 27 wherein less than all of the estimate values within the estimate matrix are used to determine the condition of the object.

30. The system of claim 27 wherein the differencing module only uses the estimate values that represent the most recent time point within each estimate matrix to determine the condition of the object.

31. The system of claim 27 comprising providing a single estimate vector for each time point represented across multiple estimate matrices to determine the condition of the object.

32. The system of claim 31 wherein the single estimate vector is provided by using at least one of:
  selecting the estimate vector with one or more estimate values that has a maximum, minimum, or median value relative to other estimate vectors at the time point across multiple estimate matrices,
  calculating an average, a weighted average, or weighted norm of the estimate values at the time point across multiple estimate matrices, and
  selecting an estimate vector with the greatest similarity to a corresponding input vector relative to other estimate vectors at the time point across multiple estimate matrices.

33. The system of claim 27 wherein the empirical model provides an estimate vector to determine the condition of the object by using at least one of:
  an estimate vector within each estimate matrix that has a maximum, minimum, or median estimate value,
  a weighted average or weighted norm of the estimate values in the estimate matrix to form a single estimate for each matrix, and
  the estimate vector within the estimate matrix with the greatest similarity to a respective corresponding input vector.

34. The system of claim 1 wherein the empirical model is configured to use the similarity measures as weights in a calculation with a three-dimensional collection of learned sequential pattern matrices that represents parameters that are not represented in the input pattern arrays.

35. The system of claim 34 wherein the reference data used to generate the similarity measures do not represent all of the parameters represented by the three-dimensional collection.

36. The system of claim 34 wherein the three-dimensional collection represents only parameters that are not represented by the input pattern arrays.

37. The system of claim 35 wherein the three-dimensional collection represents both parameters that are not represented by the input pattern arrays and parameters that are represented by the input pattern arrays.

38. The system of claim 1 comprising a localization module to predetermine which reference data is to be used to generate the estimate values for each input pattern array.

39. The system of claim 1 comprising an adaption module configured to add the input pattern arrays to the reference data when the estimate values indicate the corresponding input pattern array represents normal operation.

40. A monitoring system for determining the condition of an object, comprising:
  an empirical model operated by at least one processor and comprising reference data that indicates the normal operational state of the object and in the form of a plurality of learned, equal-size, time sequential and multi-dimensional pattern matrices, each learned, equal-size, time sequential and multi-dimensional pattern matrix having a plurality of reference vectors, each reference vector having reference values representing a plurality of parameters, each of the plurality of learned, equal-size, time sequential and multi-dimensional pattern matrices being equal in size to a corresponding input multi-dimensional pattern array, and
  input data representing a plurality of parameters indicating the current condition of the object, the input data being a plurality of input multi-dimensional pattern arrays,
  wherein the empirical model is configured to generate estimate values based on a calculation that uses the input data and the learned, equal-size, time sequential and multi-dimensional pattern matrices to determine a similarity measure between the input data and reference values in the plurality of learned, equal-size, time sequential, and multi-dimensional pattern matrices; and
  a differencing module comparing the estimate values to corresponding input values so that resulting values from the comparison can be used to determine the condition of the object.

41. A monitoring system for determining the condition of an object, comprising:
  an empirical model operated by at least one processor and comprising reference data that indicates the normal operational state of the object, the reference data being grouped in equal-sized and multi-dimensional training arrays, each of the training arrays being equal in size to a corresponding input multi-dimensional pattern array and each training array including a plurality of time-ordered reference vectors sequenced in time, and
  input data representing a plurality of parameters indicating the current condition of the object, the input data being a plurality of input multi-dimensional pattern arrays,
  wherein the empirical model is configured to generate estimate values based on a calculation that uses both the input data and the reference data to determine similarity measures between the input data and the reference data, wherein the estimate values are generated in the form of an estimate matrix having a plurality of time-ordered estimate vectors, each estimate vector having estimate values representing multiple parameters; and
  a differencing module comparing at least one estimate vector for each time period represented by the estimate matrix to the input data so that the resulting values from the comparison can be used to determine the condition of the object.

* * * * *